United States Patent
Ali et al.

(10) Patent No.: US 12,413,094 B1
(45) Date of Patent: Sep. 9, 2025

(54) DC MICROGRID CLUSTERS AND METHOD OF CONTROLLING THE SYSTEM

(71) Applicant: KING FAHD UNIVERSITY OF PETROLEUM AND MINERALS, Dhahran (SA)

(72) Inventors: Mohamed Abdelfattah Zaery Mohamed Ali, Dhahran (SA); Syed Muhammad Amrr, Dhahran (SA); Mohammad Ali, Dhahran (SA); Muhammad Suhail Shaik Hussain, Dhahran (SA); Mohammad A. Abido, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/190,705

(22) Filed: Apr. 27, 2025

(51) Int. Cl.
*H02J 13/00* (2006.01)
*H02J 1/00* (2006.01)

(52) U.S. Cl.
CPC .......... *H02J 13/00006* (2020.01); *H02J 1/00* (2013.01); *H02J 2203/10* (2020.01); *H02J 2300/40* (2020.01)

(58) Field of Classification Search
CPC .... H02J 13/00006; H02J 1/00; H02J 2203/10; H02J 2300/40
See application file for complete search history.

(56) References Cited

FOREIGN PATENT DOCUMENTS

| CN | 113258574 A | 8/2021 |
| CN | 114865613 A | 8/2022 |
| CN | 113988478 B | 10/2024 |
| CN | 118646010 B | 10/2024 |

OTHER PUBLICATIONS

Zaid Hamid Abdulabbas Al-Tameemi, et al., "Control strategies of DC microgrids cluster: A comprehensive review", Energies, vol. 14, Issue 22, Nov. 12, 2021 (34 pages).

*Primary Examiner* — Daniel Cavallari
(74) *Attorney, Agent, or Firm* — Oblon, McClelland, Maier &Neustadt, L.L.P.

(57) ABSTRACT

A power generation system for operating a direct current (DC) microgrid (MG) cluster comprises a DC MG cluster including a plurality of DC MGs interconnected via tie-lines for transferring electric power based on bus voltage differences. Each DC MG includes a plurality of distributed generation units (DGUs) supplying local loads. The power generation system also includes a distributed hierarchical control system comprising a primary controller, a secondary controller, and a tertiary controller controls the operation of the DC MG cluster. A two-layered cyber network supports communication between DGUs and MGs via lower and upper layers, respectively, with pinning links enabling inter-layer communication. The tertiary controller minimizes total generation cost, the secondary controller ensures optimal power allocation, and the primary controller performs droop control. A user-defined control parameter sets a predefined upper limit for convergence time, enabling prescribed performance-based predefined time (PP-PDT) control across the DC MG cluster.

20 Claims, 21 Drawing Sheets

DC MICROGRID CLUSTERS AND METHOD OF CONTROLLING THE SYSTEM

STATEMENT OF ACKNOWLEDGEMENT

Support provided by King Fahd University of Petroleum and Minerals (KFUPM) is gratefully acknowledged.

STATEMENT REGARDING PRIOR DISCLOSURE BY THE INVENTORS

Aspects of this technology are described in an article by Mohamed Zaery, Syed Muhammad Amrr, Mohammad Ali, Muhammad Suhail Shaik Hussain, and Mohammad A. Abido, titled "Prescribed Performance-Based Distributed Predefined Time Control for DC Microgrid Clusters," published on IEEE Transactions on Circuits and Systems I: Regular Papers, the content of which is herein incorporated by reference.

BACKGROUND

Technical Field

The present disclosure is directed to a distributed hierarchical control system for a direct current (DC) microgrid (MG) cluster utilizing a prescribed performance-based predefined time (PP-PDT) control strategy.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Direct current (DC) microgrids (MGs) represent a transformative evolution in the design and deployment of modern electric power distribution systems. A DC microgrid is a localized energy system that includes a network of distributed energy resources (DERs), such as solar photovoltaic (PV) systems, wind turbines, and energy storage systems, interconnected via DC distribution lines. These systems operate independently or in conjunction with the main grid to supply electric power to local loads.

DC microgrids offer numerous advantages over conventional alternating current (AC) systems. The proliferation of DC-native loads and generation sources, such as battery storage systems, electric vehicle charging infrastructure, data centers, LED lighting, and consumer electronics, renders the AC-DC-AC conversion chain inefficient and unnecessary. In contrast, DC MGs eliminate redundant conversion stages, minimize power losses, and enable more compact and efficient system designs. Additionally, DC systems avoid the complexity of reactive power compensation and frequency synchronization, which are inherent challenges in AC networks.

The development of DC MGs is further motivated by the global shift towards renewable energy systems (RES), energy storage technologies, and electronic load infrastructure. As intermittent energy sources such as solar and wind are integrated into the grid, the need for localized, flexible, and intelligent energy management systems becomes more critical. DC MGs allow seamless integration of renewable resources with enhanced reliability, reduced latency, and improved control granularity. These advantages arise from the avoidance of unnecessary DC/AC conversions and challenges related to reactive power and frequency regulation [See: H. Lotfi and A. Khodaei, "AC versus DC microgrid planning," IEEE Trans. Smart Grid, vol. 8, no. 1, pp. 296-304, 2015]. Moreover, the modular and scalable architecture, as disclosed, supports deployment in diverse environments, from rural electrification and smart buildings to military bases and disaster recovery zones.

To ensure stable and economical operation of DC MGs, a hierarchical control framework is typically adopted. These interconnected systems maximize renewable utilization and bolster system resilience against intermittency and load fluctuation. Within such clusters, a hierarchical control framework is generally adopted. The primary control layer operates locally at each distributed generation unit (DGU) to regulate output voltage and limit circulating currents. The secondary control layer restores the average voltage of each MG to its nominal value and manages intra-MG power sharing. The tertiary control layer coordinates inter-MG power flow to minimize the global Total Generation Cost (TGC) and optimize resource utilization across the cluster [See: J. M. Guerrero et al., "Hierarchical control of droop-controlled AC and DC microgrids," IEEE Trans. Ind. Elect., vol. 58, no. 1, pp. 158-172, 2010]. Traditionally, the secondary and tertiary control layers rely on centralized architectures, which require high-bandwidth communication infrastructure and are susceptible to single-point failures.

To enhance scalability and resilience, distributed control systems have been explored. These systems decentralize decision-making by enabling local controllers to coordinate through sparse cyber networks. In a distributed setting, MGs exchange limited information with neighboring units to achieve voltage stabilization and optimal dispatch without relying on a centralized controller. This reduces communication overhead, enhances fault tolerance, and facilitates plug-and-play capability of MGs and DGUs.

Despite these advancements, several critical challenges persist. First, existing distributed control strategies primarily rely on asymptotic consensus algorithms, which lack guaranteed convergence time. In systems with rapidly varying loads or intermittent generation, such as those incorporating stochastic renewable energy sources, asymptotic convergence may be too slow for practical applications. Second, although finite-time and fixed-time consensus techniques have been proposed to overcome this limitation, they are either sensitive to initial conditions or require complex gain tuning. Third, most approaches do not offer explicit control over transient behavior, such as overshoot magnitude or settling dynamics, leading to degraded performance under dynamic conditions.

Moreover, existing methods generally overlook the requirement for explicit performance guarantees within predefined time bounds. Ensuring that voltage regulation and power-sharing errors remain confined within a specified range over time is vital for safe operation in sensitive applications. Further, traditional schemes do not scale efficiently in large systems with complex interconnections and non-ideal communication networks.

In terms of related art, CN118646010B discloses a distributed control system for hybrid AC/DC microgrids using multi-port interconnection converters. The system employs inner-loop voltage controllers and sparse cyber communication to regulate power flow and voltage references. Although it reduces cyber dependencies and enables power sharing through droop-based mechanisms, it does not incorporate adaptive timing guarantees or prescribed transient control.

CN113988478B describes a distributed economic optimization method for interconnected DC microgrids using equal incremental cost (IC) rates. The method minimizes total generation cost by adjusting power flows based on bus voltage differences. However, the approach is constrained by the need for accurate IC alignment and lacks the capability to enforce convergence within predefined time intervals or maintain error bounds under disturbances.

CN113258574A presents a generalized predictive control algorithm for managing power flow in DC MG clusters. The algorithm replaces traditional PID-based tertiary control with predictive modeling to improve dynamic response and facilitate load adaptation. While offering better power balancing, the system does not guarantee performance within bounded time or explicitly regulate transient state behavior.

To further illustrate the evolution of control approaches, hybrid centralized-distributed frameworks have been introduced to address reliability and coordination issues across clusters. Pinning-based methods selectively assign reference-following roles to certain DGUs to reduce communication load. Leader-follower schemes and master-slave hierarchies have been used to align voltage and current profiles, while consensus-based cooperative controls have addressed economic dispatch and proportional load sharing across diverse MGs.

Finite-time consensus strategies have demonstrated accelerated convergence and resilience to disturbances. However, their performance remains sensitive to initial system conditions and controller parameterization. Fixed-time consensus techniques eliminate dependence on initial states but require intricate controller designs to balance stability and convergence guarantees. Predefined-time (PDT) consensus frameworks offer a compelling alternative by introducing a tunable settling time that is independent of initial conditions and controlled by a single parameter. When combined with Prescribed Performance Functions (PPF), this enables simultaneous enforcement of transient and steady-state behavior, offering bounded overshoot, decay time, and error margins.

SUMMARY

In an exemplary embodiment, a direct current (DC) power generation system is disclosed. The DC power generation system includes a DC microgrid (MG) cluster and a distributed hierarchical control system for controlling operation of the DC MG cluster. The DC MG cluster includes a plurality of DC MGs interconnected via tie-lines. Electric power is transferred among the plurality of DC MGs, based on bus voltage differences between the plurality of DC MGs. Each DC MG includes a plurality of distributed generation units (DGUs) interconnected via local tie-lines. The plurality of DGUs supply electric power to local loads. The distributed hierarchical control system includes a primary controller, a secondary controller, and a tertiary controller. The distributed hierarchical control system further includes a two-layered cyber network. A lower layer of the cyber network is used for communication between the plurality of DGUs within each DC MG, while an upper layer of the cyber network is used for communication between the plurality of DC MGs. Pinning links are used for communication between the lower and upper layers. Within a user-defined settling time, the tertiary controller manages power flow within the DC MG cluster to minimize an overall total generation cost of the plurality of DC MGs, the secondary controller ensures optimized power allocation among the plurality of DGUs of each DC MG, and the primary controller performs droop control for the plurality of DGUs of the plurality of DC MGs. An upper limit of convergence time for the secondary controller and the tertiary controller is preset based on a single control parameter determined by a user of the power generation system, so as to perform a prescribed performance-based predefined time (PP PDT) control.

In another exemplary embodiment, a method for operating a DC power generation system is disclosed. The DC power generation system includes a DC MG cluster and a distributed hierarchical control system. The DC MG cluster includes a plurality of DC MGs interconnected via tie-lines. Electric power is transferred among the plurality of DC MGs, based on bus voltage differences between the plurality of DC MGs. Each DC MG includes a plurality of DGUs interconnected via local tie-lines. The plurality of DGUs supply electric power to local loads. The distributed hierarchical control system includes a primary controller, a secondary controller, and a tertiary controller. The distributed hierarchical control system further includes a two-layered cyber network. A lower layer of the cyber network is used for communication between the plurality of DGUs within each DC MG, while an upper layer of the cyber network is used for communication between the plurality of DC MGs. Pinning links are used for communication between the lower and upper layers. The method includes, within a user-defined settling time, via the tertiary controller, managing power flow within the DC MG cluster to minimize an overall total generation cost of the plurality of DC MGs, via the secondary controller, ensuring optimized power allocation among the plurality of DGUs of each DC MG, and via the primary controller, performing droop control for the plurality of DGUs of the plurality of DC MGs. An upper limit of convergence time for the secondary controller and the tertiary controller is preset based on a single control parameter determined by a user of the power generation system, so as to perform a PP PDT control.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
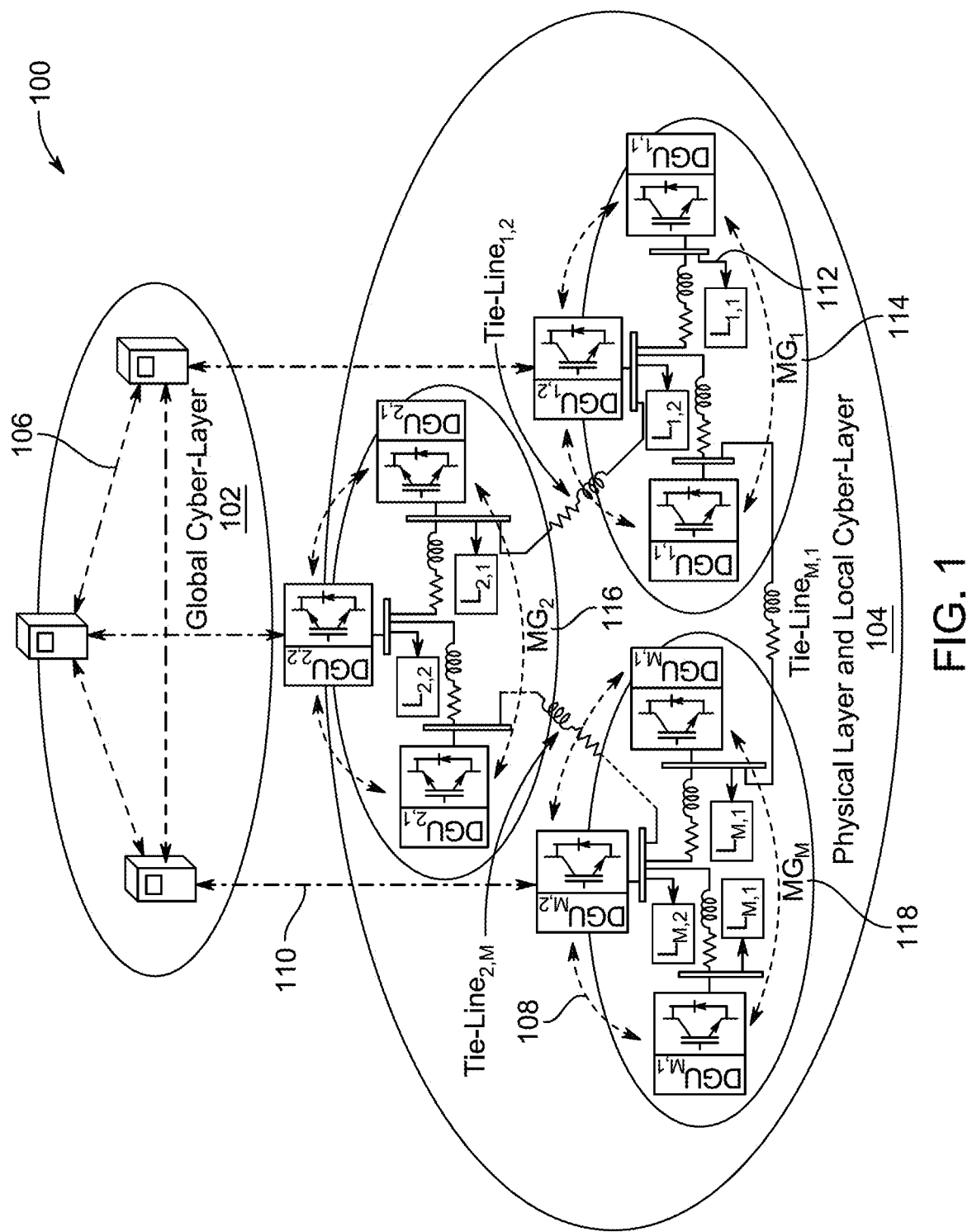
FIG. 1 is a schematic diagram of a cyber-physical system for distributed control and optimal operation of interconnected DC microgrid (MG) clusters, according to certain embodiments.

In the drawings, like reference numerals designate identical or corresponding parts throughout the several views. Further, as used herein, the words "a", "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure directs to a distributed hierarchical control framework incorporating a Prescribed Performance-based Predefined Time (PP-PDT) control strategy. Conventional distributed control strategies for DC microgrid (MG) clusters often rely on asymptotic or finite-time consensus techniques, which lack explicit control over convergence time and transient behavior. These limitations result in delayed stabilization, tracking inaccuracies, and diminished system performance under dynamic load conditions and cyber uncertainties. To address these challenges, the PP-PDT controller enables convergence of voltage regulation and cost consensus errors within user-defined performance bounds and a tunable, predefined settling time, independent of initial conditions. This is achieved through transformation-based control laws and layered cyber-physical coordination. The present disclosure significantly improves transient response, ensures bounded tracking performance, and enhances scalability and fault tolerance of DC MG clusters under practical operational constraints, thereby advancing the state of the art in real-time microgrid control systems.

FIG. 1 illustrates a cyber-physical system 100 configured for distributed control and optimal operation of interconnected direct current (DC) microgrid (MG) clusters. The cyber-physical system 100, also referred to as a system 100, integrates a global cyber-layer 102 and a physical layer and local cyber-layer 104 to enable scalable coordination and hierarchical control of multiple MGs. The cyber-physical system 100 is designed to facilitate optimal power dispatch, real-time communication, and hierarchical synchronization among dispatchable generation units (DGUs) and renewable energy resources distributed across MG clusters. The system 100 supports deployment in applications such as community-based energy systems, remote energy networks, and smart grid clusters.

The global cyber-layer 102 comprises a plurality of supervisory controllers configured to coordinate operation of multiple MGs. The supervisory controllers are implemented on distributed control platforms and are operable to communicate over a plurality of global cyber links 106. The plurality of global cyber links 106 form a network-wide communication means among the supervisory controllers. Each of the global cyber link 106 may be implemented using secure wide-area communication technologies such as optical fiber, satellite uplinks, or dedicated Ethernet protocols. The global cyber links 106 enable data sharing across MGs to achieve consensus and distributed optimization in power allocation and frequency regulation.

The physical layer and local cyber-layer 104 includes a plurality of MG clusters and their corresponding local control and communication systems. The MGs within the physical layer are interconnected through a plurality of power lines 112, forming a network of energy nodes that collectively supply and balance load demands. Each MG cluster in the physical layer is capable of operating autonomously or in coordination with other MGs, depending on the availability of inter-cluster communication and control.

In the illustrated embodiment, three representative MG clusters are shown, $MG_1$ 114, $MG_2$ 116, and $MG_m$ 118. Each MG cluster comprises dispatchable DGUs, such as fuel-based generators, and non-dispatchable DGUs, such as photovoltaic (PV) solar panels and wind turbines. The dispatchable DGUs are configured to participate in economic dispatch decisions based on quadratic cost functions of power output. For example, a dispatchable DGU within $MG_2$ 116 is configured with a generation cost of the form $C(P)=\gamma P^2+\beta P+\alpha$, where $\gamma$, $\beta$, and $\alpha$ represent non-negative generation cost coefficients. The DGUs are optimized to operate at cost-effective setpoints, while non-dispatchable DGUs are controlled to output maximum available power without being included in the economic dispatch formulation due to their intermittent characteristics.

Each MG cluster is equipped with a local controller implemented in digital control units (DCUs), which execute control policies and communicate with neighboring DGUs over local cyber links 108. The local cyber links 108 form a mesh communication structure within each MG cluster, enabling distributed optimization and local consensus. For instance, in $MG_1$ 114, the DGUs exchange control messages over local cyber links 108 to maintain voltage stability and balance power generation with demand.

The system 100 further includes a plurality of pinning links 110, each configured to connect at least one DGU-level controller in the physical layer and local cyber-layer 104 with a supervisory controller in the global cyber-layer 102. The pinning links 110 enable hierarchical control by allowing selected local controllers to relay aggregated state variables, such as voltage, frequency, and generation data, to the global layer. The global cyber-layer 102 utilizes the information received through pinning links 110 to compute the global consensus index (IC) value for optimal load dispatch across all MG clusters. The pinning links 110 may be implemented using dedicated or virtual communication paths to ensure low-latency updates from selected nodes in each MG.

Each power line 112 within the system interconnects DGUs to local loads and establishes tie-lines between adjacent MG clusters. The power lines 112 facilitate bi-directional power flow and voltage coupling between MGs. For example, $MG_1$ 114 and $MG_2$ 116 are interconnected by a tie-line that enables energy sharing when $MG_2$ 116 has a surplus of generation relative to demand. The tie-line operation is monitored and controlled based on voltage differences across MG boundaries to maintain safe and efficient power exchange.

The hierarchical coordination between the global cyber-layer 102 and the physical layer and local cyber-layer 104 is achieved through layered communication and decision processes. The local controllers in $MG_1$ 114, $MG_2$ 116, and $MG_m$ 118 are configured to compute local optimal power generation values based on internal demand, local resource availability, and DGU cost characteristics. These values are then synchronized across MG clusters using consensus algorithms implemented in the global cyber-layer 102, ensuring that the marginal cost of power generation converges to a globally optimal value, denoted as the global optimal IC value.

The cyber-physical system 100 enables dynamic and decentralized energy coordination. For example, when $MG_m$ 118 experiences an increase in local demand, the local controller recalculates generation setpoints and shares this information through local cyber links 108. Simultaneously, the supervisory controller in the global cyber-layer 102 detects the imbalance and sends updated consensus values through the global cyber links 106 and the pinning links 110 to adjacent MGs, such as $MG_2$ 116. This initiates a coordinated response that allows $MG_2$ 116 to increase generation and export energy to $MG_m$ 118 over tie-lines, thus restoring system-wide balance.

In one implementation, the global cyber-layer 102 also performs distributed economic dispatch optimization using a Lagrangian formulation to align power generation costs across MG clusters. The optimization ensures that each DGU with inactive generation limits operates at a common marginal cost, while DGUs at their capacity limits operate at cost boundaries defined by their respective quadratic cost functions. The output of this optimization process is used to update generation references at each DGU via the local cyber links 108. The optimization process is mathematically implemented as below:

$$C_{K,i}(\mathcal{P}_{K,i})=\gamma_{K,i}(\mathcal{P}_{K,i})+\beta_{K,i}(\mathcal{P}_{K,i})+\sigma_{K,i} \quad (1)$$

where $\gamma_{K,i}$, $\beta_{K,i}$, and $\alpha_{K,i}$ are non-negative generation cost constants of an $i^{th}$ DGU in a $K^{th}$ MG. Accordingly, the ED problem of the DC MGs cluster is presented as:

$$\sum_{K=1}^{M}\sum_{i=1}^{n}C_{K,i}(\mathcal{P}_K) \quad (2a)$$

Such that:

$$\sum_{K=1}^{M}\sum_{i=1}^{n}(\mathcal{P}_{K,i}) = \sum_{K=1}^{M}P_{K}^{D} + \sum_{K=1}^{M}\sum_{i=1}^{n}\mathcal{P}_{K,i}^{loss} = \mathcal{P}_{total} \quad (2b)$$

and $$\underline{\mathcal{P}_{K,i}} < \mathcal{P}_{K,i} < \overline{\mathcal{P}_{K,i}} \quad (2c)$$

where $\overline{\mathcal{P}_{K,i}}$ and $\underline{\mathcal{P}_{K,i}}$ are the maximum and minimum generation capacity of the $DGU_{K,i}$, respectively. First, the quality constraint given in (2c) is neglected. To maintain the optimum power dispatching of the MG clusters, the Lagrange operator $L(\mathcal{P}_{K,i},\lambda)$ is expressed as:

$$\mathcal{L}(\cdot) = \sum_{K=1}^{M}\sum_{i=1}^{n}C_{K,i}(\mathcal{P}_{K,i}) + \lambda\left(\mathcal{P}_{total} - \sum_{K=1}^{M}\sum_{i=1}^{n}\mathcal{P}_{K,i}\right) \quad (3)$$

where, $\lambda$ is the Lagrange multiplier related to the constraint given in (2c). To optimize the Lagrange operator, the derivative is taken with respect to both $\mathcal{P}_{K,i}$, and $\lambda$. Accordingly, aligning the ICs of all DGUs at the optimal IC value, denoted as $\lambda^*$ ensures the optimal power dispatch across the MGs cluster while neglecting DGUs' capacity limits.

$$\lambda^* = \frac{\mathcal{P}_{total} - \sum_{K=1}^{M} \sum_{i=1}^{n} \frac{\beta_{K,i}}{2\gamma_{K,i}}}{\sum_{K=1}^{M} \sum_{i=1}^{n} \frac{1}{2\gamma_{K,i}}} \quad (4)$$

Moreover, respecting inequality constraint (2c), the optimal operational point may require slight modifications as:

$$\begin{cases} 2\gamma_{K,i}\mathcal{P}_{K,i} + \beta_{K,i} = \lambda^* \text{ for } \underline{\mathcal{P}_{K,i}} < \mathcal{P}_{K,i} < \overline{\mathcal{P}_{K,i}} \\ 2\gamma_{K,i}\mathcal{P}_{K,i} + \beta_{K,i} \leq \lambda^* \text{ for } \mathcal{P}_{K,i} = \overline{\mathcal{P}_{K,i}} \\ 2\gamma_{K,i}\mathcal{P}_{K,i} + \beta_{K,i} \geq \lambda^* \text{ for } \mathcal{P}_{K,i} = \underline{\mathcal{P}_{K,i}} \end{cases} \quad (5)$$

This indicates that all DGUs with inactive generation limits must have identical ICs for optimal loading allocation. However, for DGUs operating at their power limits $\overline{\mathcal{P}_{K,i}}$ and $\underline{\mathcal{P}_{K,i}}$, the IC value can be either $\beta_{K,i}+2\gamma_{K,i}\overline{\mathcal{P}_{K,i}}$ or $\beta_{K,i}+2\gamma_{K,i}\underline{\mathcal{P}_{K,i}}$, respectively. Furthermore, while all DGUs optimally supply the local load within their MG, each MG operates at its local optimum point. For preserving the optimal global load sharing across interconnected MGs, the ICs of all DGUs within the cluster should converge at a globally optimal IC value, defined as the global optimum operating point.

Referring back to FIG. 1, a two-layered cyber network, including an upper layer and a lower layer, is implemented. The lower layer is responsible for the interaction within the n DGUs of each MG, while the upper layer maintains the communication between the MGs through the sparse global cyber network.

The local MG cyber network of $MG_K$ is conceptualized through the directed graph $G_K(V_K, \varepsilon_K, A_K)$, where $V_K=(V_{K,1}, V_{K,2}, \ldots, V_{K,n}) \in R^N$ forms a vertex set of the $K^{th}$ MG's n interlinked DGUs. Concurrently, $E_K=(E_1, E_2, \ldots)$, $E \subset V_K \times V_K$ is the edge set that symbolizes the DGU's communicative interconnections. The adjacency matrix A of the $K^{th}$ MG is defined as $A_K=[a_{K_{ij}}]_{n \times n} \in R^{n \times n}$ that encodes the cybernetic linkage weights; $a_{K_{ij}}>0$ denotes the presence of a cyber-link between $DGU_{K,i}$ and $DGU_{K,j}$, and the zero weight denotes no link.

Similarly, the upper layer's directed graph is defined as $\check{S}(\check{V},\check{\varepsilon},\check{A})$, where $\check{V}=(\overline{\mathcal{V}}_1, \overline{\mathcal{V}}_2, \ldots, \overline{\mathcal{V}_M})$ is the MG's node set and $\check{\varepsilon}=(\overline{\mathcal{E}}_1, \overline{\mathcal{E}}_2, \ldots)$, $\check{\varepsilon} \subset \check{V} \times \check{V}$ is the cyber link set of M MGs with a diagonal adjacency matrix $\check{A}=[\overline{a_{KL}}]_{M \times M}$. Further, the pinning links are used for communication between the lower and upper cyber networks. In every MG, a minimum of one DGU is selected for receiving reference values and transmitting the essential data to its respective MG agent. Thus, the communication pinning weight is $b_{K,i}>0$ if the pinned $DGU_{K,i}$ is connected to the $MG_K$ agent via the pinning link defined as $(\overline{\mathcal{V}_K}, V_{K,i})$, else $b_{K,i}=0$. This results in a diagonal pinning matrix $B_K=\text{diag}(b_{K,i}, \ldots, b_{K,n})$, which carries the pinning gains for each $MG_K$.

The preliminaries of the PPF includes class $K^1$ functions, time stability, Prescribed Performance Function, and state transformation.

A scalar continuous function $\kappa: R_{\geq 0} \to [0,1)$ is a member of class $K^1$, defined as $\kappa \in K^1$, if it is strictly increasing, $\kappa(0)=0$, and $\kappa(s) \to 1$ as $s \to \infty$. Moreover, if the function $\kappa \in K^1$, and is differentiable, it is a differentiable class $K^1$ function. Consequently, $\exists$ a continuous function $\Phi: R_{\geq 0} \to R_+$ such that the derivative of $\kappa$ w.r.t. s, denoted as $$\frac{d\kappa}{ds} = \Phi(s),$$

where $\Phi(s)>0$, which can be alternatively expressed in integral form as $$\kappa(s) = \int_0^s \Phi(x)dx.$$

Given that $\kappa(s)$ approaches 1 as s approaches infinity, the function $\varphi$ adheres to $$\int_0^\infty \Phi(s)ds = 1.$$

Thus, $\Phi$ and $\kappa$ are, respectively, the probability density function (PDF) and cumulative distribution function (CDF) of positive random variables. Some examples of class $K^1$ functions are (i) $\kappa(s)=1-e^{-s}$, (ii)

$$\kappa(s) = \frac{2}{\pi}\tan^{-1}(s)$$

and (iii)

$$\kappa(s) = \frac{s}{\beta + s} \text{ with } \beta > 0.$$

The time stability is predefined as below.
A continuous system of state $z \in R^n$ is assumed.

$$\dot{z}=f(z,\rho), z(0)=z_0, \quad (6)$$

where $\rho \in R^l$ is a controllable vector of the z dynamics, and zero is the distinctive equilibrium point of the described system.

For Lemma 1, considering the system outlined in equation (6), and assuming the presence of a class of $K^1$ functions ($\Xi \in K^1$) that are differentiable over $R\setminus\{0\}$, along with the existence of a positive definite, differentiable, and radially bounded Lyapunov function denoted as $V: R^n \to R \geq 0$, if the time derivative of V satisfies the given inequality for any positive time $T_c \in R_+$ and $\rho$:

$$\dot{V}(z) \leq -\frac{1}{T_c(1-\sigma)} \frac{\Xi(V(z))^\sigma}{\Xi'(V(z))}, \text{ for } z \in R^n \setminus 0$$

If $\sigma$ lies in the interval (0,1), then the equilibrium point (i.e., the origin) serves as a predetermined time-stable point for system defined in (6). Simply put, the solution of system (6), denoted as z(t), will converge to zero within a pre-established time frame.

In second definition, time stability is predefined as below. The equilibrium points of (6) will be termed as predefined-time stable if they are fixed-time stable, and there exists a vector $\rho \in R^l$ for $T_c$, such that the settling-time function of (6) satisfies the specified condition:

$$\sup_{z_0 \in R^n} (z_0) \le T_c.$$

The PPF sets the desired steady-state and transient behavior for any system state $z \in R$ to behave during the control execution. The behavior limits are chosen in line with prescribed constraint performance.

In a first definition, the PPF is defined by a smooth function $\varrho(t): R^+ \to R^+$ under the following conditions:
i. Q (t) is greater that zero and monotonically decaying.
ii.

$$\lim_{t \to \infty} \varrho(t) = \varrho_\infty > 0.$$

In this disclosure, the PPF is selected as:

$$\varrho(t) = (\varrho_0 - \varrho_\infty)\exp^{-\wp t} + \varrho_\infty \quad (7)$$

where $\varrho_0 > 0$ and $\varrho_\infty \in (0, \varrho_0)$ are the initial and final values, and $\wp > 0$ is the decaying rate. The PPF parameter values are pre-designed to follow the desired state response. The state z prescribed steady and transient performance is represented in terms of PPF as follows:

$$-\underline{\xi}\varrho(t) < z < \overline{\xi}\varrho(t) \forall t \ge 0 \quad (8)$$

where, coefficients $\underline{\xi} > 0$ and $\overline{\xi} > 0$ are regarded as prescribed constants. Therefore, restricting z within the limit described in (8) is equivalent to preserving the prescribed state response. Further, the values of $\underline{\xi}$, $\overline{\xi}$, and $\wp_i$ should be selected to satisfy the constraint: $-\underline{\xi}\varrho_0 < z(0) < \overline{\xi}\varrho_0$.

The required steady state and transient response of z is achieved by appropriate selection of the parameters $\underline{\xi}$, $\overline{\xi}$, $\varrho_0$, $\varrho_\infty$, and $\wp$. Therefore, $\overline{\xi}\varrho_0$, and $-\underline{\xi}\varrho_0$ define the upper limit of the overshoot and lower limit of the undershoot, respectively, for z. Further, the rate of convergence of z is set by $\wp$, and $\varrho_\infty$ dictates the maximum steady-state value.

Further, the state transformation is calculated. Since the state z has inequality constraints (8), it is difficult to deal with during control design directly. Instead, the state z is transformed into a new variable $\theta$ such that the constrained control problem becomes an equivalent unconstrained problem. In this regard, firstly, modifying the state z using a modulated state as $\theta(t) = z(t)/\varrho(t)$. Then, a new transformed variable $\zeta$ is obtained as:

$$\theta = T(\theta) = \ln(\underline{\xi} + \theta) - \ln(\overline{\xi} - \theta) \quad (9)$$

The function $T_i(\cdot): (-\underline{\xi}, \overline{\xi}) \to (-\infty, +\infty)$ is strictly increasing and smooth which has following properties:

$$\lim_{\vartheta \to -\underline{\xi}} T(\vartheta) = -\infty, \text{ and } \lim_{\vartheta \to \overline{\xi}} T(\vartheta) = +\infty \quad (10)$$

With reference to (9) and (10), if $\varepsilon$ is limited, then $\theta(t) = z(t)/\varrho(t)$ bounds within a compact subset of $(-\underline{\xi}, \overline{\xi}) \forall t \ge 0$, which allows to hold the prescribed constraint. Thus, to ensure the prescribed performance, the boundedness of $\zeta$ needs to be assured by the controller.

The above transformation has the following properties:

$$\varepsilon \ge c|\theta| = c|z|/\varrho, \text{ where } c = 4/(\overline{\xi} + 1) \quad (11)$$

$$\mu(t) = \frac{\overline{\xi} + \underline{\xi}}{(\vartheta(t) + \underline{\xi})(\overline{\xi} - \vartheta(t))} \cdot \frac{1}{\varrho} > 0 \quad (12)$$

$$\dot{\varrho}/\varrho > \wp > 0. \quad (13)$$

Figure 2:
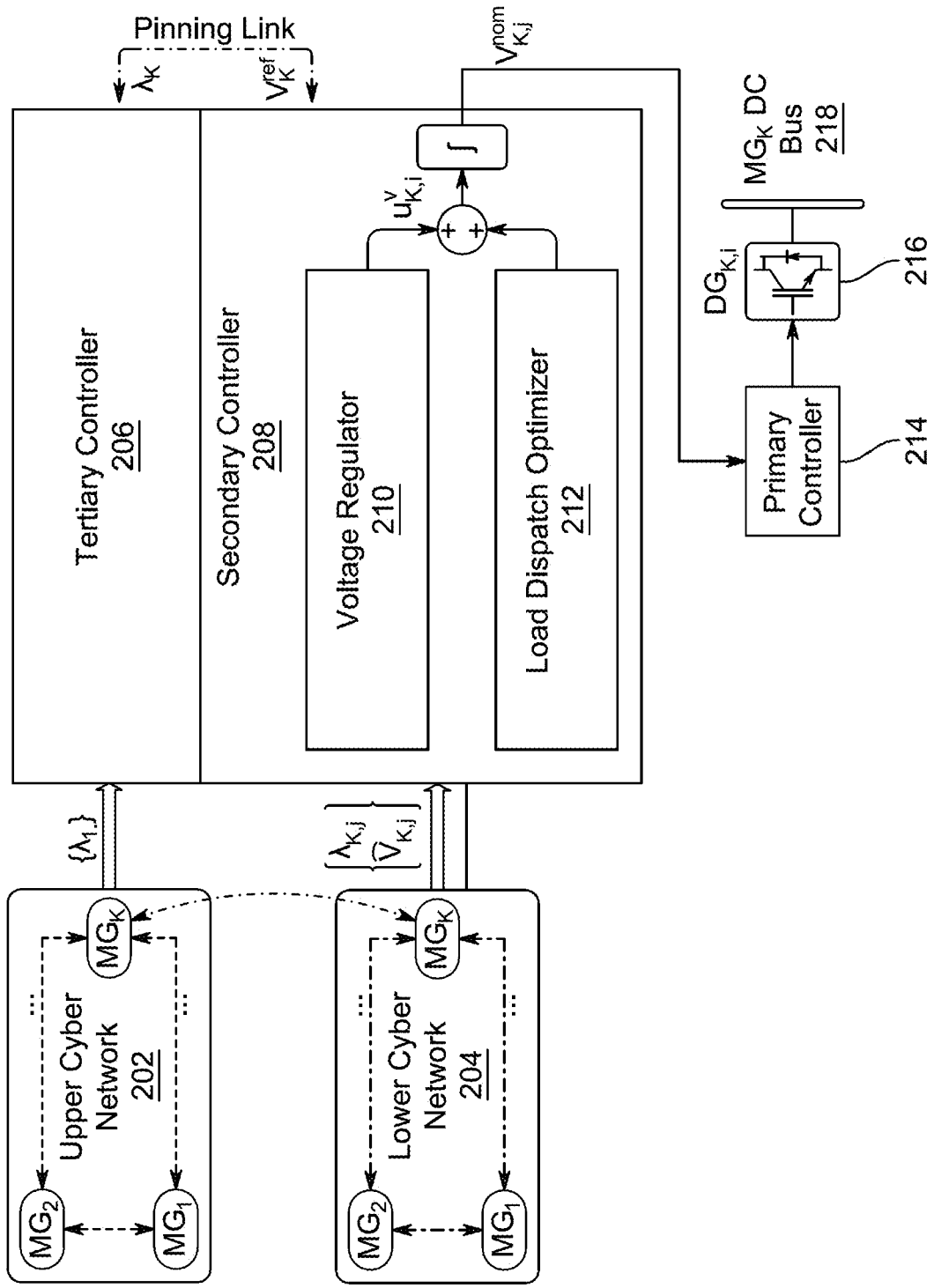
FIG. 2 is a block diagram illustrating a distributed hierarchical control system, according to certain embodiments.

FIG. 2 illustrates a distributed hierarchical control system 200 for a DC microgrid (MG) cluster, in accordance with certain embodiments of the present disclosure. The distributed hierarchical control system 200, also referred to as a system 200, is implemented as a cyber-physical system for power dispatch optimization, voltage regulation, and global power coordination, in accordance with certain embodiments of the present disclosure. The system 200 is configured to realize a Prescribed Performance-based Predefined Time (PP-PDT) control system, which is implemented as a hierarchical three-layered control framework comprising a tertiary controller, a secondary controller, and a primary controller, integrated through a dual-layer cyber communication infrastructure.

The Prescribed Performance-based Predefined Time (PP-PDT) control system is implemented as a control architecture for dynamically driving tracking errors, such as cost consensus error and voltage deviation error, within user-defined performance bounds, and ensuring convergence to steady-state targets within user-specified finite time intervals. The PP-PDT scheme achieves convergence guarantees through mathematical transformation of tracking errors and their control laws, thereby enabling the designer to define acceptable error margins (e.g., maximum allowable overshoot, steady-state bounds) and the time horizon within which convergence must occur. The PP-PDT-based control system is applied in each layer of the hierarchical control architecture to ensure optimal local and global control objectives, including local economic dispatch, voltage regulation, and inter-microgrid coordination.

At a physical layer, the system 200 comprises multiple interconnected microgrids, denoted as $MG_1$, $MG_2$, . . . . $MG_m$, where each MG includes multiple Distributed Generation Units (DGUs) 216 configured to operate as either dispatchable or non-dispatchable units. Each DGU 216 is interfaced with a DC bus 218, which facilitates local load supply and interconnection with other MGs through tie-lines. Dispatchable DGUs may include fuel-based generators whose generation costs follow a quadratic cost function, while non-dispatchable DGUs include renewable energy sources such as solar photovoltaic (PV) or wind energy systems.

The primary controller 214 is implemented as a local control module within each DGU 216, configured to perform droop-based voltage control. The droop control law modulates the output voltage $V_{K,i}$ of each DGU 216 as a function of its generation power and internal cost coefficient, expressed using a modified droop formula that integrates the DGU's incremental cost (IC). The droop coefficient is adjusted dynamically based on real-time cost signals to enable economic dispatch at the DGU level.

The secondary controller 208 is implemented as a distributed control mechanism within each MG, comprising two submodules: a load dispatch optimizer 212 and a voltage regulator 210. The secondary controller 208 receives reference values from the tertiary controller 206 and modulates the nominal voltage setpoints for the primary controller 214. The secondary controller 208 maintains each MG's average voltage at the tertiary control's set point and equalizes the ICs of the DGUs by adjusting the primary control's nominal voltage, $V_{K,i}^{nom}$, as:

$$V_{K,i} = V_{K,i}^{nom} - R_{K,i} \mathcal{P}_{K,i} \qquad (14)$$

where $V_{K,i}$ is the output voltage of $DGU_{K,i}$, and $R_{K,i}$ denotes its droop gain. By incorporating $DGU_{K,i}$'s IC, the drooping formula of the primary control can be modified as below:

$$\mathcal{V}_{K,i} = \mathcal{V}_{K,}^{nom} - \frac{R_{K,i}}{2\gamma_{K,i}} \lambda_{K,i} + \frac{R_{K,i}}{2\gamma_{K,i}} \beta_{K,i} \qquad (15)$$

The primary objectives of the secondary controller 208 are to align the ICs of all DGUs within the MG, and simultaneously stabilize its average voltage at the assigned reference level, while ensuring that the tracking errors remain within the specified performance boundaries, all within a predefined adjustable settling time. Accordingly, differentiating (15) gives:

$$\dot{\mathcal{V}}_{K,}^{nom} = \dot{\mathcal{V}}_{K,i} + \frac{R_{K,i}}{2\gamma_{K,i}} \dot{\lambda}_{K,i} = \mathcal{U}_{K,i}^v + \frac{R_{K,i}}{2\gamma_{K,i} \mathcal{U}_{K,i}^c} \qquad (16)$$

where $U_{K,i}^c$ and $U_{K,i}^v$ are the control inputs for the generation cost optimization and average voltage stability, respectively. Thus, the nominal voltage of the primary control, $V_{K,i}^{nom}$, can be maintained through:

$$\mathcal{V}_{K,i}^{nom} = \int \left( \mathcal{U}_{K,i}^v + \frac{R_{K,i}}{2\gamma_{K,i} \mathcal{U}_{K,i}^c} \right) \qquad (17)$$

Accordingly, the secondary controller 208 has two control loops. First, a load dispatch optimizer 212, and second a voltage regulator 210. The load dispatch optimizer 212 balances the ICs of all MG's DGUs within the predefined time, $t_p^c$, while preserving the tracking error upon the prescribed performance boundaries. Concurrently, the PP-PDT voltage regulator 210 aims to restore MG's average voltage to its desired level in a predetermined time, $t_p^v$. These objectives can be represented as:

$$\lim_{t \to t_p^c} |\lambda_{K,j} - \lambda_{K,i}| = 0, \ \& \ \underline{e_{K,i}^c} \le (\lambda_{K,j} - \lambda_{K,i}) \le \overline{e_{K,i}^c}$$

$$\lim_{t \to t_p^v} \left| \sum_{i=1}^n \frac{\mathcal{V}_{K,i}}{n} - \mathcal{V}_K^{ref} \right| = 0, \ \& \ \underline{e_{K,i}^v} \le \left( \sum_{i=1}^n \frac{\mathcal{V}_{K,i}}{n} - \mathcal{V}_K^{ref} \right) \le \overline{e_{K,i}^v}$$

where $\underline{e_{K,i}^c}$, $\overline{e_{K,i}^c}$, $\underline{e_{K,i}^v}$, and $\overline{e_{K,i}^v}$ are the desired lower and upper limits of cost and voltage regulation errors, respectively.

The load dispatch optimizer 212, in one implementation, is configured to align the incremental costs of all DGUs within an MG by comparing local ICs with those of neighboring DGUs through the lower cyber network 204, which supports sparse bidirectional communication links. This alignment is executed using PP-PDT-based consensus protocols that ensure convergence of IC discrepancies within a user-defined settling time $t_p^v$, while maintaining the consensus error within prescribed bounds. For example, in a 3-DGU system, each DGU iteratively adjusts its generation based on communicated IC values from its neighbors, converging to a common IC value representing the local optimum.

MG's TGC minimization can be achieved by optimally scheduling the total demands across the local DGUs. Such allocation is sustained by ensuring that all DGUs ICs are equalized at the optimal value. In which each DGU compares its IC value, $\lambda_{K,i}$, with the received values from the neighbor DGUs in the sparse cyber network, $\lambda_{K,j}$. The cost optimization consensus error, $e_{K,i}^c$, is formulated as:

$$e_{K,i}^c = \sum_{j \in \mathcal{N}_{\mathcal{K},i}} a_{K_{ij}} (\lambda_{K,j} - \lambda_{K,i}) \qquad (18)$$

Incorporating the PPF into $e_{K,i}^c$ to preserve following the prescribed response bounds. As a result, the transformed cost error is $\varepsilon_{K,i}^c = T_c(\theta_{K,i}^c)$, where $\theta_{K,i}^c = e_{K,i}^c / \varrho_{K,i}^c$. Hence, the derivative of $\varepsilon_{K,i}^c$:

$$\dot{\varepsilon}_{K,i}^c = \frac{1}{\varrho_{K,i}^c} \frac{\partial T_{K,i}^c}{\partial \vartheta_{K,i}^c} \left( \dot{e}_{K,i}^c - \frac{\dot{\varrho}_{K,i}^c}{\varrho_{K,i}^c} e_{K,i}^c \right) = \sigma_{K,i}^c (\mathcal{U}_{\mathcal{K},j}^c - \varpi_{K,i}^c) \qquad (19)$$

The proposed economic auxiliary control preserves the consensus error to abide by the desired prescribed performance bounds and converges it to zero within the predefined settling time $t_p^c > 0$ with $0 < \alpha_c < 1$:

$$\mathcal{U}_{\mathcal{K},i}^c = \frac{1}{\sigma_{K,i}^c} \mathcal{T}_{K,i}^c + \varpi_{K,i}^c \qquad (20)$$

where, $$\mathcal{T}_{K,i}^c = \frac{-1}{t_p^c (1 - \alpha_c)} \frac{\mathcal{K}(|\varepsilon_{K,i}^c|)^{\alpha_c}}{\mathcal{K}'(|\varepsilon_{K,i}^c|)} \text{sign}(\varepsilon_{K,i}^c) \qquad (21)$$

In theorem 1, consider the transformed consensus error dynamics (19) and a connected undirected local cyber graph $G_K$. With the employment of the proposed distributed PP-PDT control (20), the trajectories of the transformed error $\varepsilon_{K,i}^c$ and the actual error $e_{K,i}^c$ will be forced to zero within a predefined time, i.e., accomplishing the consensus for DGUs' ICs within a tunable predefined time $t_p^c$. Moreover, the developed algorithm will hold the prescribed error constraint.

The theorem 1 is presented in two steps.

Step 1 represents convergence of $\varepsilon_{K,i}^c$ within $t \le t_p^c$.

Considering a Lyapunov functional $$\mathcal{W}_1(\varepsilon_k^c) = \sum_{i=1}^N |\varepsilon_{K,i}^c| = |\varepsilon_K^c|_1, \text{ where } \varepsilon_K^c = [\varepsilon_{K,1}^c, \varepsilon_{K,2}^c, \dots, \varepsilon_{K,n}^c]^\top.$$

Note that the time derivative of an absolute operator on x with power $\alpha > 0$ is $d/dt|x| = \alpha |x|^{\alpha-1} \text{sign}(x) \dot{x}$.

Extending this result to the first derivative of a norm vector:

$$\frac{d}{dt} \|\varepsilon_K^c\| = \frac{\varepsilon_K^{c\top}}{\|\varepsilon_K^{c\top}\|} \frac{d}{dt}(\varepsilon_K^c) = \|\varepsilon_K^{c\top}\|^0 \dot{\varepsilon}_K^c \qquad (22)$$

So, the derivative of $W_1$ along with the relation $\varepsilon_{K,i}{}^c = \theta_{K,i}{}^c \varrho$ for $i=1, \ldots, n$, can be expressed as:

$$\dot{W}_1 = \sum_{i=1}^{n} \left\lfloor \varepsilon_{K,i}^{cT} \right\rfloor^0 \dot{\varepsilon}_{K,i}^c = \sum_{i=1}^{n} \left\lfloor \varepsilon_{K,i}^{cT} \right\rfloor^0 \sigma_{K,i}^c (\mathcal{U}_{K,i}^c - \varpi_{K,i}^c) = \quad (23)$$

$$\sum_{i=1}^{n} \left\lfloor \varepsilon_{K,i}^{cT} \right\rfloor^0 \overline{\mathcal{U}}_{K,i}^c = \left\lfloor \varepsilon_{K,i}^{cT} \right\rfloor^0 \overline{\mathcal{U}}_K^c$$

where $\overline{U}_K{}^c = [\overline{U}_{K,1}{}^c, \ldots, \overline{U}_{K,N}{}^c]^T \in \mathbb{R}^N$. Substituting $\overline{U}_{K,i}{}^c$ in (23) from (21)

$$\mu_{K,i}^c = \frac{1}{t_p^c(1-\alpha_c)} \frac{\mathcal{K}(|\varepsilon_{K,i}^c|)^{\alpha_c}}{\mathcal{K}'(|\varepsilon_{K,i}^c|)}$$

gives:

$$\dot{W}_1 = -\left\lfloor \varepsilon_{K,i}^T \right\rfloor^0 \underbrace{\text{diag}(\mu_{K}^c, \ldots, \mu_{K,N}^c)}_{\Upsilon_k^c \in \mathbb{R}^{N \times N}} \text{sign}(\varepsilon_K^c) = -\left\lfloor \varepsilon_{K,i}^T \right\rfloor^0 \Upsilon_k^c \text{sign}(\varepsilon_K^c) \leq \quad (24)$$

$$-\lambda_{min}(\Upsilon_K^c) \left\lfloor \varepsilon_K^T \right\rfloor^0 \text{sign}(\varepsilon_K^c) = - \min_{\mu_{K,i}^c \in \mathbb{R}} (\mu_{K,i}^c) \left\lfloor \varepsilon_K^T \right\rfloor^0 \text{sign}(\varepsilon_K^c)$$

Here $\gamma_k{}^c$ is a diagonal matrix, its min. value will be $$\min_{\mu_{K,i}^c \in \mathbb{R}} (\mu_{K,i}^c).$$

Further, the min. of $(\mu_{K,i}{}^c)$ is determined by the error $|\varepsilon_{K,i}{}^c|$, and one can also write it as $\|\varepsilon_{K,i}{}^c\|$. Thus, $$\dot{W}_1 \leq \frac{-1}{t_p^c(1-\alpha_c)} \frac{\mathcal{K}\left(\min_{\varepsilon_{K,i}^c \in \mathbb{R}} |\varepsilon_{K,i}^c|\right)^{\alpha_c}}{\mathcal{K}'\left(\min_{\varepsilon_{K,i}^c \in \mathbb{R}} |\varepsilon_{K,i}^c|\right)} \left\lfloor \varepsilon_K^T \right\rfloor^0 \text{sign}(\varepsilon_K^c) \leq \quad (25)$$

$$\frac{1}{t_p^c(1-\alpha_c)} \frac{\mathcal{K}(\|\varepsilon_K^c\|)^{\alpha_c}}{\mathcal{K}'(\|\varepsilon_K^c\|)} \left\lfloor \varepsilon_K^T \right\rfloor^0 \text{sign}(\varepsilon_K^c)$$

Since $\lfloor \varepsilon_{K,i}{}^{cT} \rfloor^0 \text{sign}(\varepsilon_{K,i}{}^c) = |\varepsilon_{K,i}{}^c|/\varepsilon_{K,i}{}^c = \lfloor \varepsilon_{K,i}{}^c \rfloor^0$. As a result, $$\lfloor \varepsilon_{K,i}^{cT} \rfloor^0 \text{sign}(\varepsilon_{K,i}^c) = |\varepsilon_{K,i}^c|/\varepsilon_{K,i}^c = \lfloor \varepsilon_{K,i}^c \rfloor^0 = 1 \quad (26)$$

Incorporating (26) into the Lyapunov analysis yields:

$$\dot{W}_1 \leq \frac{-1}{t_p^c(1-\alpha_c)} \frac{\mathcal{K}(\|\varepsilon_K^c\|)^{\alpha_c}}{\mathcal{K}'(\|\varepsilon_K^c\|)} \leq \frac{-1}{t_p^c(1-\alpha_c)} \frac{\mathcal{K}(W_1)^{\alpha_c}}{\mathcal{K}'(W_1)}$$

The above inequality satisfies the predefined time stability given in Lemma 1. Therefore, the consensus cost optimization error vector $\varepsilon_K{}^c$ will converge to zero in predefined time $t_p{}^c$. The subsequent section of the proof demonstrates the convergence of the modulated state $\theta_{K,i}{}^c$, and consequently, the original cost error.

Step 2 represents convergence of original cost error also within $t_p{}^c$.

The derivative of the modulated variable $\theta_{K,i}{}^c$ w.r.t. time is:

$$\dot{\theta}_{K,i}^c = \frac{1}{\varrho_{K,i}^c} \left( \dot{\varepsilon}_{K,i}^c - \frac{\dot{\varrho}_{K,i}^c}{\varrho_{K,i}^c} \varepsilon_{K,i}^c \right) = \frac{1}{\varrho_{K,i}^c}(\mathcal{U}_{K,i} - \varpi_{K,i}^c)$$

Substituting the value of $U_{K,i}{}^c$ from (20), following can obtain:

$$\dot{\theta}_{K,i}^c = \frac{1}{\varrho_{K,i}^c \sigma_{K,i}^c} \mathcal{U}_{K,i}^c \quad (27)$$

$$= \Psi_{K,i}^c \overline{\mathcal{U}}_{K,i}^c = \frac{-\Psi_{K,i}^c}{t_p^c(1-\alpha_c)} \frac{\mathcal{K}(|\varepsilon_{K,i}^c|)^{\alpha_c}}{\mathcal{K}'(|\varepsilon_{K,i}^c|)} \text{sign}(\varepsilon_{K,i}^c)$$

where $$\Psi_{K,i}^c = \varrho_{K,i}^c \sigma_{K,i}^c \frac{1}{\partial T_{K,i}^c / \partial \theta_{K,i}^c} > 0$$

from property (12). Since $\overline{U}_{K,i}{}^c$ is a function of $\varepsilon_{K,i}{}^c$ and it is already proved in Step 1 that $\varepsilon_{K,i}{}^c$ is converging. Further, for $t \in [0, t_p{}^c)$, $\overline{U}_{K,i}{}^c$ is bounded. In light of the above results, consider another Lyapunov function $W_2 = |\theta_{K,i}{}^c|$. The time derivative of $W_2 = \dot{W}_2 = \lfloor \theta_{K,i}{}^c \rfloor^0 \dot{\theta}_{K,i}{}^c$. Using (27) yields:

$$\dot{W}_2 = -\lfloor \theta_{K,i}^c \rfloor^0 \frac{\Psi_{K,i}^c}{t_p^c(1-\alpha_c)} \frac{\mathcal{K}(|\varepsilon_{K,i}^c|)^{\alpha_c}}{\mathcal{K}'(|\varepsilon_{K,i}^c|)} \text{sign}(\varepsilon_{K,i}^c) \quad (28)$$

Since $\text{sign}(\varepsilon_{K,i}{}^c)$ only gives the polarity of $\varepsilon_{K,i}{}^c$, and also $\varepsilon_{K,i}{}^c$ is a function of $\theta_{K,i}{}^c$, defined in (9) and (10). Therefore, $\text{sign}(\varepsilon_{K,i}{}^c)$ will have the same polarity as $\text{sign}(\theta_{K,i}{}^c)$. Consequently, $\text{sign}(\varepsilon_{K,i}{}^c)$ \$ can be replaced with $\text{sign}(\theta_{K,i}{}^c)$ in (28). Moreover, from property (11), one can write $K(|\varepsilon_{K,i}{}^c|) \geq K(|\theta_{K,i}{}^c|)$. Therefore, substituting these results in $\dot{W}_2$ gives:

$$\dot{W}_2 \leq -\frac{\Psi_{K,i}^c}{t_p^c(1-\alpha_c)} \frac{\mathcal{K}(|\varepsilon_{K,i}^c|)^{\alpha_c}}{\mathcal{K}'(|\varepsilon_{K,i}^c|)} \underbrace{\lfloor \theta_{K,i}^c \rfloor^0 \text{sign}(\varepsilon_{K,i}^c)}_{=1} \leq \quad (29)$$

$$-\frac{1}{t_p^c(1-\alpha_c)} \frac{\mathcal{K}(|\varepsilon_{K,i}^c|)^{\alpha_c}}{\mathcal{K}'(|\varepsilon_{K,i}^c|)}$$

Once again, inequality (29) agrees with the predefined time convergence condition of Lemma (1). Therefore, $\theta_{K,i}{}^c$ will also converge to zero within a predefined time $t_p{}^c$. As $\theta_{K,i}{}^c$ goes to the origin, the original error $e_{K,i}{}^c = \varrho_{K,i}{}^c \theta_{K,i}{}^c$ will also go to zero within a predefined time.

The voltage regulator 210 within the secondary controller 208 is configured to restore the average voltage of each MG to a tertiary-assigned voltage reference $V_{ref}{}^K$, within a separate predefined time interval $t_p{}^v$. This is achieved through a distributed consensus-based observer network that uses voltage estimates from neighboring DGUs and pinning links 110 to one or more reference DGUs. The voltage consensus error is transformed using a prescribed performance function and modulated by an auxiliary control law to ensure convergence within the prescribed voltage error bounds. Each DGU relies solely on the estimations from its adjacent DGUs within the local cyber network for estimating the average voltage across the MG as described by:

$$\dot{V}_{K,i} = V_{K,i} + \int \sum_{m \in N_{K,i}} a_{K_{ij}}(\hat{V}_{K,j} - \hat{V}_{K,i}) dt \qquad (30)$$

A distributed PP-PDT voltage regulator has been introduced to swiftly restore the average voltage of the MG to the assigned reference level, $V_K^{ref}$, within an adjustable time, $t_p^v$. Each DGU compares its estimated average voltage value $\hat{V}_{K,i}$ with those of neighboring DGUs $\hat{V}_{K,j}$. Notably, each MG has at least one pinned DGU receiving the reference voltage through the bidirectional pinning links, simplifying the cyber network and enabling the control system's fully distributed nature. The voltage consensus error of the pinned DGU, $e_{K,i}^v$, is calculated by summing the differences between the estimated voltages of each DGU and those of their neighbors, along with MG's reference voltage as:

$$e_{K,i}^v = \sum_{m \in N_{K,i}} a_{K_{ij}}(\hat{V}_{K,j} - \hat{V}_{K,i}) + b_{K_{ij}}(V_K^{ref} - \hat{V}_{K,i}) \qquad (31)$$

Similar to the cost error analysis, integrating the PP, the transformed voltage error $\varepsilon_{K,i}^v = T^v(\theta_{K,i}^v)$, where $\theta_{K,i}^v = e_{K,i}^v / \varrho_{K,i}^v$. Derivative of $\varepsilon_{K,i}^v$ is:

$$\dot{\varepsilon}_{K,i}^v = \frac{1}{\varrho_{K,i}^v} \frac{\partial T_{K,i}^v}{\partial \theta_{K,i}^v}\left(\dot{e}_{K,i}^v - \frac{\dot{\varrho}_{K,i}^v}{\varrho_{K,i}^v} e_{K,i}^v\right) = \sigma_{K,i}^v(\mathcal{U}_{K,i} - \varpi_{K,i}^v) \qquad (32)$$

where $$\sigma_{K,i}^v = \frac{1}{\varrho_{K,i}^v} \frac{\partial T_{K,i}^v}{\partial \theta_{K,i}^v} > 0,$$

and $$\varpi_{K,i}^v = \frac{\dot{\varrho}_{K,i}^v}{\varrho_{K,i}^v} e_{K,i}^v.$$

Accordingly, the proposed auxiliary controller for the voltage regulator with $t_p^v > 0$, and $0 < \alpha_v < 1$ is given as:

$$\mathcal{U}_{K,i}^v = \frac{1}{\sigma_{K,i}^v} \overline{\mathcal{U}}_{K,i}^v + \varpi_{K,i}^v \qquad (33)$$

where $$\mathcal{U}_{K,i}^v = \frac{-1}{t_p^v(1 - \alpha_v)} \frac{\mathcal{K}(|\varepsilon_{K,i}^v|)^{\alpha_v}}{\mathcal{K}'(|\varepsilon_{K,i}^v|)} \text{sign}(\varepsilon_{K,i}^v) \qquad (34)$$

Theorem 2: Consider the transformed voltage consensus error dynamics (32) with $G_M$ being connected. Using the proposed distributed PP-PDT voltage control (33), the transformed voltage error $\varepsilon_{K,i}^v$ and the actual voltage error $e_{K,i}^c$ will converge to zero within a predefined time $t_p^v$, i.e., the average voltage of MG will reach the set point value assigned by the tertiary control within $t_p^v$. Further, the proposed algorithm will also satisfy the prescribed voltage error constraint.

Proof: The proof for voltage regulation will adopt the same approach used in the proof of Theorem 1. Selecting another Lyapunov candidate $$\mathcal{W}_3(\mathcal{E}_K^v) = \sum_{i=1}^n |\varepsilon_{K,i}^v| = \|\mathcal{E}_K^v\|_1,$$

where $\varepsilon_K^v = [\varepsilon_{K,1}^v, \varepsilon_{K,2}^v, \ldots, \varepsilon_{K,n}^v]^T$. Following the same steps as above (with symbols having similar representation for voltage case), one can get:

$$\dot{\mathcal{W}}_3 = \sum_{i=1}^n \|\varepsilon_{K,i}^v\|^0 \dot{\varepsilon}_{K,i}^v = \sum_{i=1}^n \|\varepsilon_{K,i}^v\|^0 \overline{\mathcal{U}}_{K,i}^v = \|\varepsilon_K^{vT}\|^0 \overline{\mathcal{U}}_{K,i}^v$$

After substituting voltage control law (34) and employing the same approach as in Proof of Theorem 1 ultimately yields:

$$\mathcal{U}_{K,i}^v = \frac{-1}{t_p^v(1 - \alpha_v)} \frac{\mathcal{K}(\mathcal{W}_3)^{\alpha_v}}{\mathcal{K}'(\mathcal{W}_3)} \qquad (35)$$

The above equation satisfies the predefined time stability given in Lemma 1. Likewise, the second part of the proof will have the same step as in Theorem 1. Thus, both the transformed voltage error $\varepsilon_{K,i}^v$ and the actual voltage error $e_{K,i}^v$ will converge to zero in predefined time $t_p^v$. Hence, MG's average voltage will be successfully stabilized to the desired $V_K^{ref}$.

The tertiary controller 206 is implemented as a global coordination module across the MG cluster. It communicates with local secondary controllers via the upper cyber network 202. The tertiary controller 206, responsible for reducing the global TGC by modifying MGs' voltage set points, $V_{ref}^K$, for optimizing the transferred power between them.

The tertiary controller 206 adjusts the reference voltages $V_{ref}^K$ for each MG in a manner that minimizes the global total generation cost (TGC) across the entire cluster. The tertiary controller 206 compares each MG's incremental cost with that of its neighbors, denoted as $\lambda K$, and generates voltage references that steer the system toward a globally optimal dispatch configuration. This is achieved using a PP-PDT-based distributed optimization algorithm with convergence guaranteed within a predefined settling time tp. For instance, in a three-MG cluster, each tertiary controller 206 align their MGs' ICs at the global optimum value within the predetermined settling time, $t_p$, while confining the tracking errors within the bounds, which are described as:

$$\lim_{t \to t_p} |\lambda_K - \lambda_L| = 0, \ \&\underline{e_K} \leq (\lambda_K - \lambda_L) \leq \overline{e_K} \qquad (36)$$

where $\underline{e_K}$, $\overline{e_K}$ are the lower and upper performance boundaries of the tertiary control layer, respectively. Variable $\lambda_K$ represents the IC of $MG_K$. Since the secondary controller maintains the IC equalization across all DGUs within an MG, the pinned DGU's IC $\lambda_{K,i}$ indicates the IC of its MG, $\lambda_K$. Therefore, pinning links will transmit each DGU's IC value to the global cyber network MG agent. Accordingly, for $MG_K$, the tertiary controller assesses its IC value, $\lambda_K$, by comparing it with those of the neighboring MGs ($\lambda_L$). Based on this comparison, the global IC error can be defined as:

$$e_K = \sum_{L \in N_K} a_{KL}(\lambda_K - \lambda_L) \tag{37}$$

Similarly, integrating the PP gives the transformed global IC error $\varepsilon_K = T(\theta_K)$, where $\theta_K = e_K/\varrho_K$. Therefore, $$\dot{\varepsilon}_K = \frac{1}{\varrho_{K,i}^v} \frac{\partial T_K}{\partial \theta_K}\left(\dot{e}_K - \frac{\varrho_K}{\varrho_K}e_K\right) = \sigma_K(\mathcal{U}_K - \varpi_K) \tag{38}$$

where $$\sigma_K = \frac{1}{\varrho_{K,i}^v} \frac{\partial T_K}{\partial \theta_K},$$

and $$\varpi_K = \frac{\varrho_K}{\varrho_K} e_K.$$

Therefore, the global PP-PDT auxiliary control input can be formulated as:

$$\mathcal{U}_K = \frac{-1}{\sigma_K t_p(1-\alpha)} \frac{\mathcal{K}(|e_K|)^\alpha}{\mathcal{K}'(|e_K|)} \text{sign}(e_K) + \varpi_K \tag{39}$$

where $t_p > 0$ and $0 < \alpha < 1$. Then, the voltage reference for each MG is calculated from (40). Then each MG agent transmits this value to the pinned DGU through the pinning links, so the secondary control adjusts MG's average voltage by PP-PDT voltage regulator as expressed in (33).

$$V_k^{ref} = V_{ref} + \int U_K dt \tag{40}$$

In theorem 3, an unidirected cyber graph G is assumed for global cyber network. By employing the proposed distributed PP-PDT control scheme (39), the ICs of MGs can be converted in an adjustable predefined settling time ($t_p$).

Theorem 3 is proved here. Consider a Lyapunov candidate $$W_4 = \sum_{K=1}^M |\varepsilon_K| = \|\varepsilon_K\|_1,$$

where $\varepsilon_K = [\varepsilon_1, \varepsilon_2, \ldots, \varepsilon_M]^T$. Following the same steps as in Theorem 1, the time derivative of $W_4$ after substituting the global control (39) and simplification gives:

$$\dot{W}_4 \leq \frac{-1}{t_p(1-\alpha)} \frac{\mathcal{K}(|e_K|)^\alpha}{\mathcal{K}'(|e_K|)} \tag{41}$$

Here, the predefined time conference is also ensured for the MG's IC.

The two-layer cyber communication network includes an upper cyber network 202 connecting the tertiary controllers of multiple MGs, and a lower cyber network 204 that facilitates intra-MG communication among DGUs. The pinning links 110 serve as unidirectional control channels from the tertiary controller to designated DGUs, which receive the global voltage references. The local cyber links 108 connect neighboring DGUs within each MG, enabling cost and voltage consensus protocols. The power lines 112 physically interconnect the DC buses 218 of different MGs, allowing power exchange based on bus voltage differentials.

In one illustrative example, consider three interconnected microgrids each comprising three DGUs. The tertiary controller 206 receives voltage setpoint references for global optimization and transmits them through pinning links to the voltage regulator 210 of each MG. Each secondary controller 208 executes the PP-PDT-based algorithms independently to achieve voltage restoration and IC alignment at the MG level. In parallel, the tertiary controller 206 coordinates with other MGs via upper cyber links 202 to synchronize the global ICs. Simulation results presented in the inventors' response confirm that this control strategy achieves rapid convergence of voltage and cost errors, even under dynamic loading and DGU configuration changes.

A simulation of three interconnected DC MG clusters was conducted in PLECS to evaluate the superiority of the developed PP-PDT control. FIG. 3A to FIG. 7D shows simulation results. Three DGUs were considered for each MG, modeled using boost converters and linked via local TLs. Table I provides a summary of the parameters for the DGUs' generation costs, global and local transmission networks, and the proposed control system. Let the employed $K^1$ function be $$\mathcal{K}(s) = \frac{s}{s+\beta} \in \mathbb{R}$$

and the P'PH is given as $\varrho_{K,i}^c = \varrho_{K,i}^v = \varrho_K = (4-0.5) \exp^{-50t} + 0.5$. The adjacency matrices for the two-layer cyber networks are given as $A_1 = A_2 = A_3 = [0,1,1; 1,0,1; 1,1,0]$ and $\check{A} = [0,1,1; 1,0,1; 1,1,0]$. Consider the pinned DGUs are $DGU_{1,1}$, $DGU_{2,1}$, and $DGU_{3,1}$", with the respective diagonal pinning matrices being $B_1 = B_2 = B_3 = \text{diag}(1,0,0)$.

TABLE I

Specification of the tested DC MGs cluster

| DGU$_{k,i}$ | $\alpha_{k,i}$ | $\beta_{k,i}$ | $\gamma_{k,i}$ | $\zeta_{k,i}$ | $\overline{P_{k,i}}$ |
|---|---|---|---|---|---|
| DGU$_{1,1}$ | 110 | 0.95 | 0.022 | $3 \times 10^{-4}$ | 450 |
| DGU$_{1,2}$ | 75 | 0.55 | 0.007 | $5 \times 10^{-4}$ | 500 |
| DGU$_{1,3}$ | 85 | 0.62 | 0.01 | $4 \times 10^{-4}$ | 400 |
| DGU$_{2,1}$ | 90 | 0.65 | 0.014 | $4 \times 10^{-4}$ | 350 |
| DGU$_{2,2}$ | 120 | 0.98 | 0.024 | $3 \times 10^{-4}$ | 300 |
| DGU$_{2,3}$ | 95 | 0.91 | 0.015 | $3 \times 10^{-4}$ | 450 |
| DGU$_{3,1}$ | 60 | 0.5 | 0.006 | $5 \times 10^{-4}$ | 300 |

TABLE I-continued

Specification of the tested DC MGs cluster

| $DGU_{3,2}$ | 100 | 0.93 | 0.019 | $3 \times 10^{-4}$ | 400 |
|---|---|---|---|---|---|
| $DGU_{3,3}$ | 80 | 0.61 | 0.009 | $4 \times 10^{-4}$ | 550 |

Transmission networks parameters

Local R = 0.6 Ω, L = 50 μH , C = 30 nF
Global R = 1.2 Ω, L = 100 μH , C = 60 nF

Control system parameters

| $t_p^c$ | $\alpha^c$ | $t_p^v$ | $\alpha^v$ | $t_p$ | $\alpha$ |
|---|---|---|---|---|---|
| 0.05 s | 0.8 | 0.05 s | 0.8 | 0.2 s | 0.8 s |

The results encompass several scenarios, such as the effectiveness of the proposed control, comparisons to existing literature, MG plug-and-play functionality, imperfect cyber networks, and delays in the cyber domain.

Figure 3A:
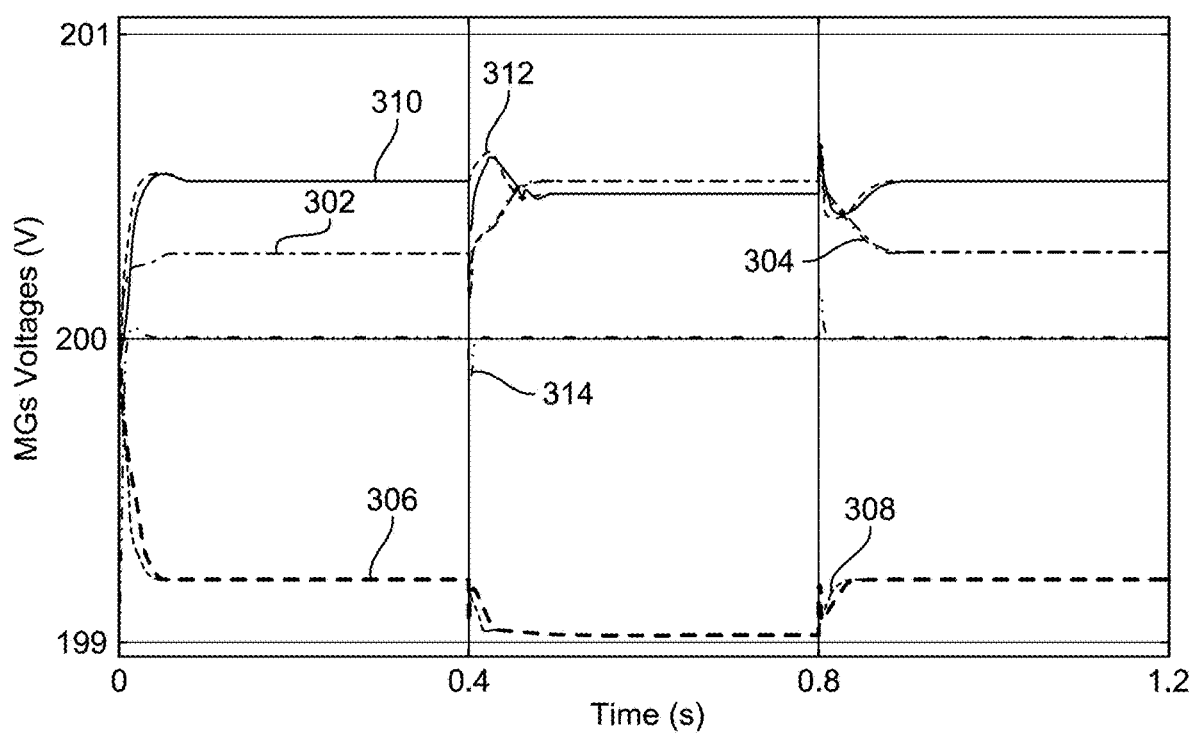
FIG. 3A is a graph illustrating the voltage trajectories of MGs under the PP-PDT control strategy, according to certain embodiments.

FIG. 3A illustrates a voltage response profile of the MG clusters under the PP-PDT control strategy. The graph represents the measured voltage levels at different microgrids, illustrated by different waveforms, depicting $V_{mg1}$ 302 and its respective reference voltage $V_{ref1}$ 304, $V_{mg2}$ 306 and its respective reference voltage $V_{ref2}$ 308, and $V_{mg3}$ 310 and its respective reference voltage $V_{ref3}$ 312. The reference voltage, depicted by a waveform 314, is dynamically adjusted by the tertiary controller 206 to maintain optimal inter-microgrid power flow. At time t=0.1 s and t=0.8 s, the MG voltages exhibit a transient deviation in response to load variations, but the secondary controller 208 stabilizes each MG's average voltage back to the setpoint value of 200V. The convergence is achieved within the predefined settling time, demonstrating ability of the PP-PDT controller to enforce voltage regulation within prescribed performance bounds.

Figure 3B:
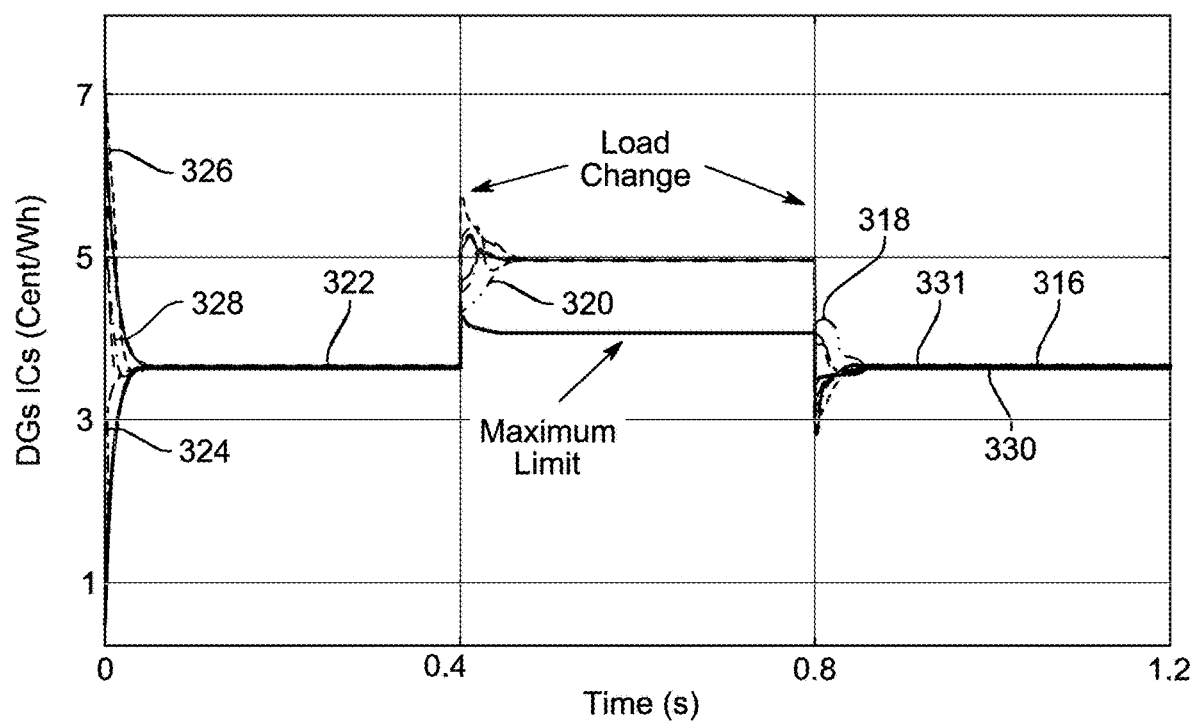
FIG. 3B is a graph illustrating the convergence of incremental costs (ICs) of DGUs under load variation, according to certain embodiments.

FIG. 3B illustrates the trajectory of instantaneous cost coefficients (ICs) of distributed generator units (DGUs) within the MG clusters, showing dynamic synchronization under cost optimization objectives. The IC values for DGUs in $MG_1$, $MG_2$, and $MG_3$ are shown by curves $\lambda_{11}$ 316, $\lambda_{12}$ 318, $\lambda_{13}$ 320, $\lambda_{21}$ 322, $\lambda_{22}$ 324, $\lambda_{23}$ 326, $\lambda_{31}$ 331, $\lambda_{32}$ 328, and $\lambda_{33}$ 330 with the global optimal cost trajectory. The consensus convergence occurs twice, corresponding to load shifts at t=0.4 s and t=0.8 s. The synchronization of all DGUs' ICs is precisely achieved at the optimal value, streamlining the optimal load power dispatching among them within the predefined settling time.

Figure 3C:
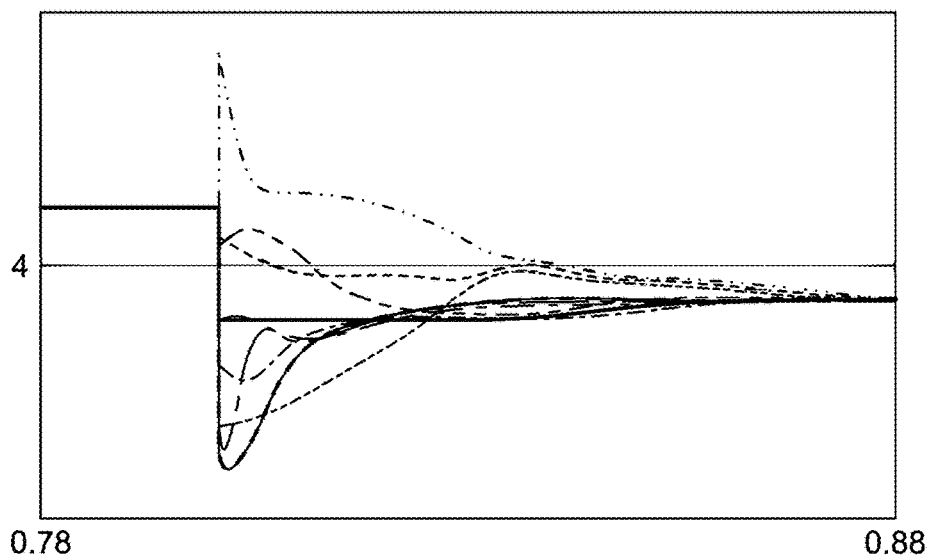
FIG. 3C is an inset graph highlighting the zoomed-in error convergence behavior for ICs, according to certain embodiments.

FIG. 3C illustrates an inset highlighting the error convergence behavior with high fidelity, confirming accurate IC equalization across DGUs in accordance with claim requirements on cost consensus within PP boundaries.

Figure 3D:
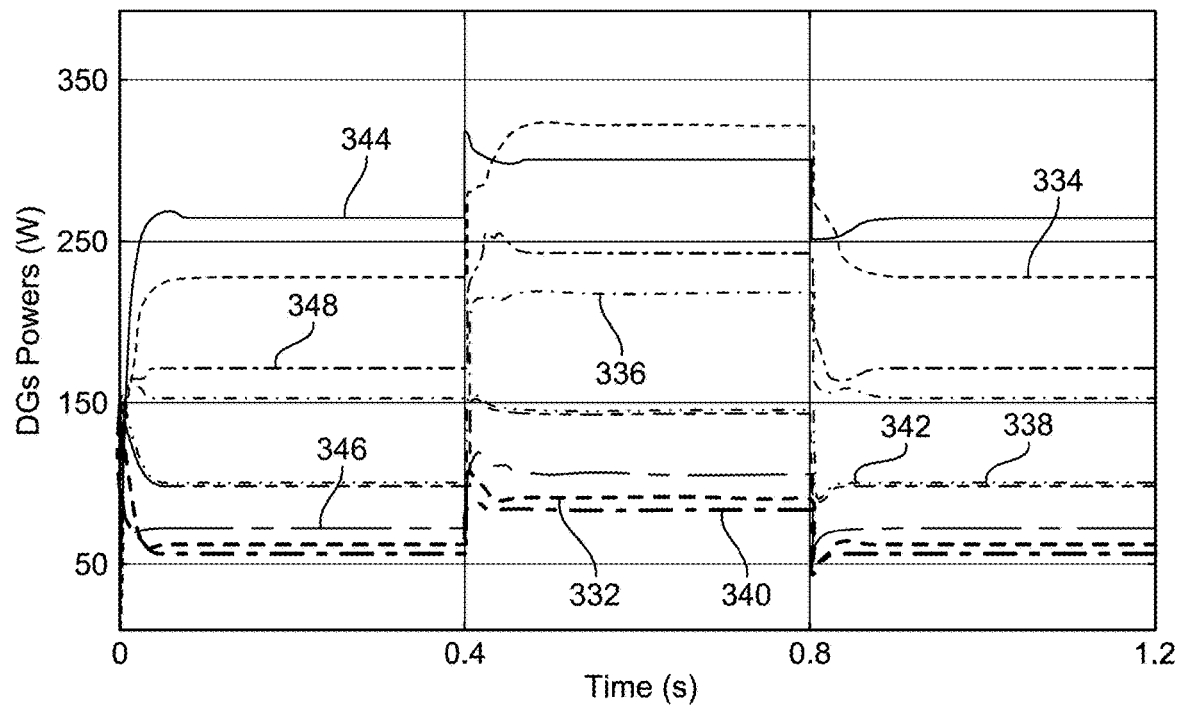
FIG. 3D is a graph illustrating the power outputs of DGUs in response to load changes under PP-PDT control, according to certain embodiments.

FIG. 3D presents the active power outputs of individual DGUs, shown as $P_{1,1}$ 332, $P_{1,2}$ 334, $P_{1,3}$ 336, $P_{2,1}$ 338, $P_{2,2}$ 340, $P_{2,3}$ 342, $P_{3,1}$ 344, $P_{3,2}$ 346, and $P_{3,3}$ 348. These power trajectories illustrate the result of load dispatch optimization under the proposed controller. When load demand increases at t=0.4 s, all DGUs participate in load sharing proportionally to their generation cost coefficients, with $DGU_{3,1}$ 344 reaching its maximum power limit of 300 W, thus demonstrating bounded optimization. Upon load drop at t=0.8 s, generation is reduced proportionally. The load dispatch optimizer 212 within the secondary controller 208 effectively maintains balance between load demands and generator capabilities while preserving generation priorities.

Figure 3E:
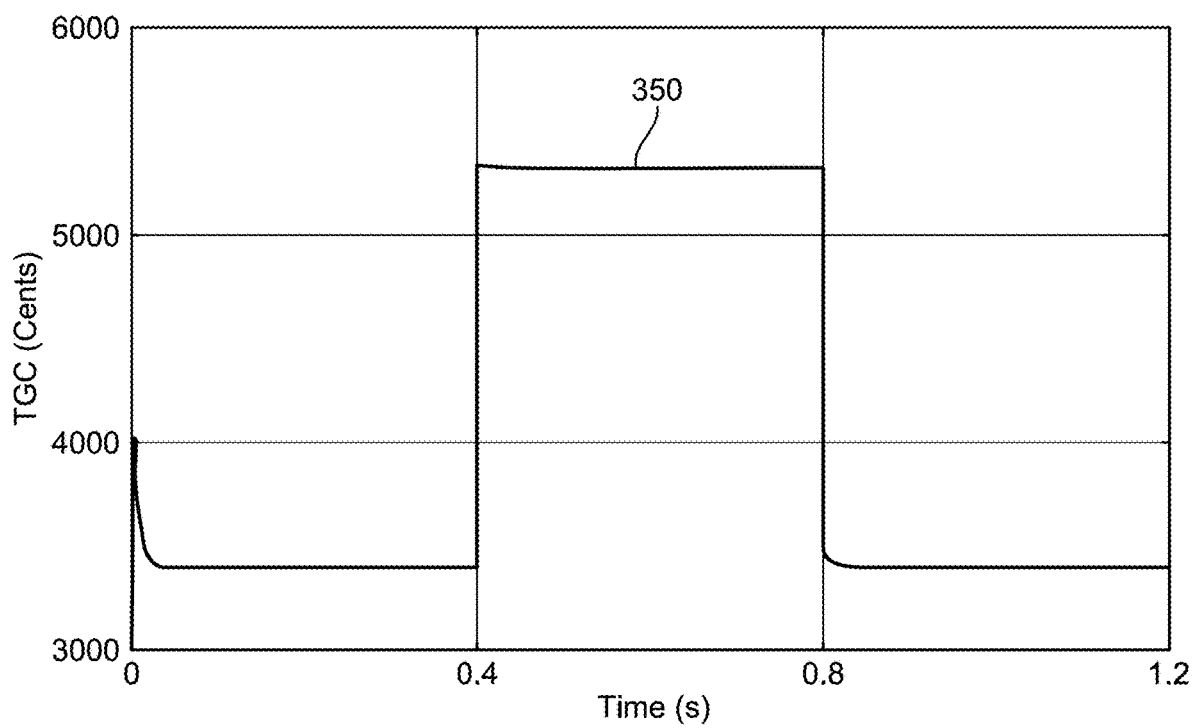
FIG. 3E is a graph illustrating the total generation cost (TGC) trajectory during dynamic load conditions, according to certain embodiments.

FIG. 3E shows the evolution of total generation cost (TGC), depicted by curve 350, across the MG cluster. At steady-state prior to t=0.4 s, the TGC stabilizes around 3000 Q units. Following the load increase, TGC surges and stabilizes at approximately 5200 Q units, reflecting cost incurred for increased generation. When demand is reduced at t=0.8 s, the TGC promptly returns to its original optimal value. The system adapts to these fluctuations while minimizing cost, demonstrating the efficacy of the PP-PDT cost optimization strategy implemented in the tertiary controller 206.

Figure 3F:
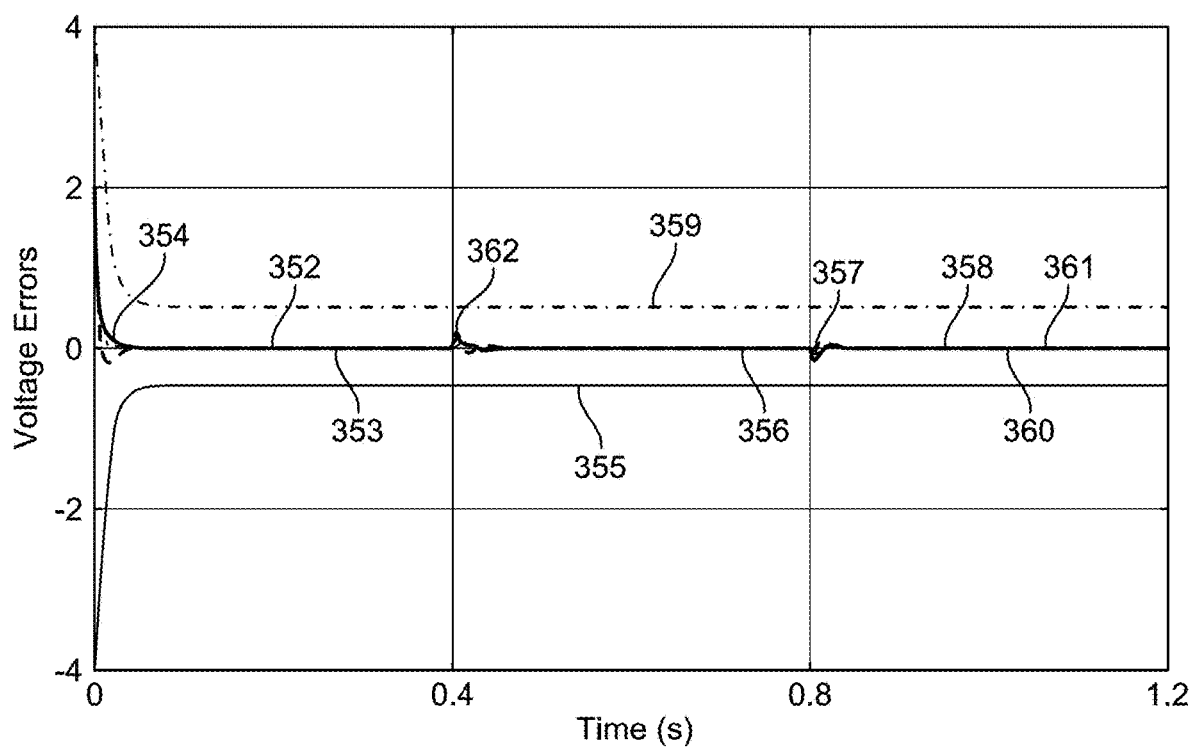
FIG. 3F is a graph illustrating voltage error profiles of DGUs within prescribed performance bounds, according to certain embodiments.

FIG. 3F illustrates the voltage error signals of all DGUs in the MG cluster. The curves represent the voltage error terms $e^v_{1,1}$ 352, $e^v_{2,1}$ 353, $e^v_{3,1}$ 354, Ps 355, $e^v_{1,2}$ 356, $e^v_{2,2}$ 357, $e^v_{3,2}$ 358, $e^v_{1,3}$ 360, $e^v_{2,3}$ 361, $e^v_{3,3}$ 362 and −Ps 359. The voltage errors for all DGUs are confined within the prescribed upper and lower bounds across the time domain, confirming that the PP-PDT voltage regulator 210 achieves tracking within predefined constraints. The transient spikes at t=0.4 s and t=0.8 s remain within the defined boundaries, illustrating the robustness of the controller under sudden load variations.

Figure 3G:
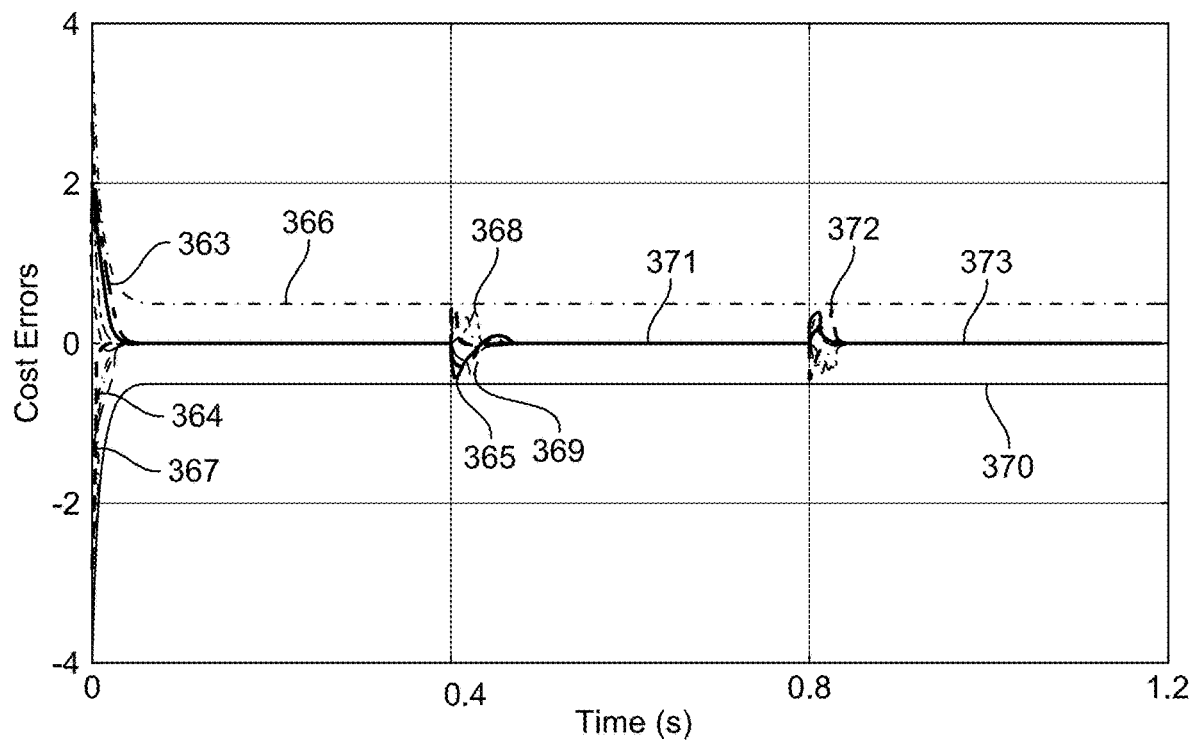
FIG. 3G is a graph illustrating local cost consensus error trajectories across DGUs, according to certain embodiments.

FIG. 3G illustrates the cost consensus error signals of DGUs within the local MGs. Each curve corresponds to a cost error value $e^{ce}_{1,1}$ 363, $e^{ce}_{2,1}$ 364, $e^{ce}_{3,1}$ 365, a performance bound $P_C$ 366, $e^{ce}_{1,2}$ 367, $e^{ce}_{2,2}$ 368, $e^{ce}_{3,2}$ 369, a performance bound $P_C'$ 370, $e^{ce}_{1,3}$ 371, $e^{ce}_{2,3}$ 372, and $e^{ce}_{3,3}$ 373. The cost errors are confined within the prescribed error tubes for the entire simulation period.

Figure 3H:
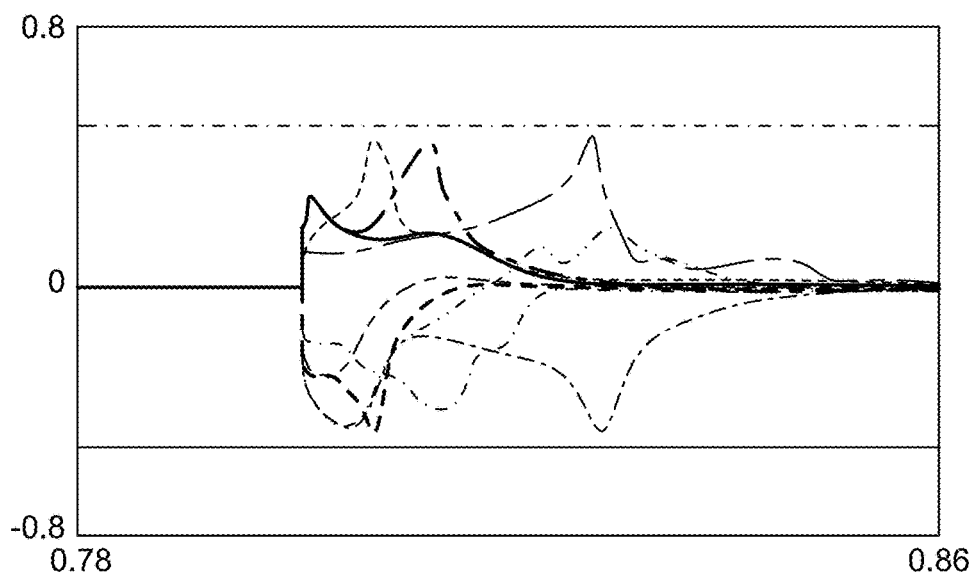
FIG. 3H is an inset graph highlighting zoomed convergence behavior for cost consensus errors, according to certain embodiments.
Figure 3I:
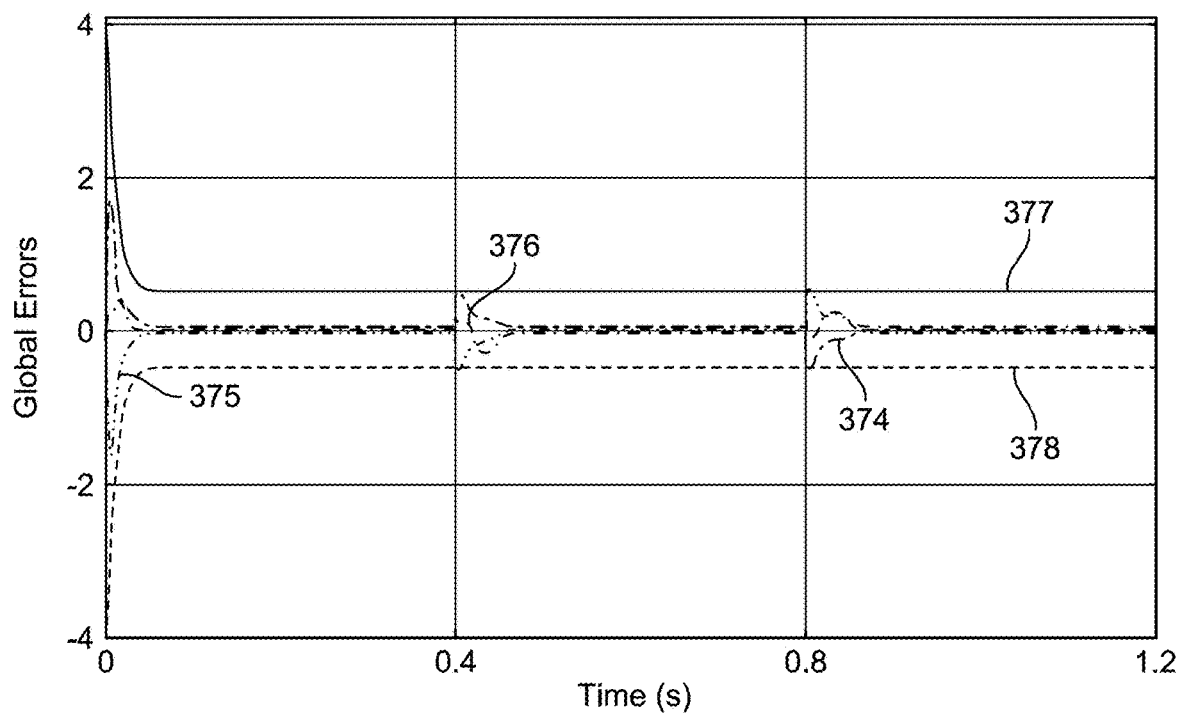
FIG. 3I is a graph illustrating global cost consensus error trajectories and performance bounds among MGs, according to certain embodiments.

FIG. 3H, as the inset of FIG. 3G, highlights the zoomed convergence behavior during rapid transients. The PP-PDT controller ensures convergence within the adjustable settling time, FIG. 3I presents global consensus errors e1 374, e2 375, and e3 376, and among interconnected MG clusters. The prescribed performance envelope is represented by upper bound $\rho^-$g 377 and lower bound $\rho\_g$ 378. The errors decrease monotonically and remain within the defined limits across all events. The tertiary controller 206 achieves synchronization of the global IC values within the desired predefined time, thereby minimizing global total generation cost. The results confirm that global optimization constraints are satisfied under varying load scenarios.

Figure 3J:
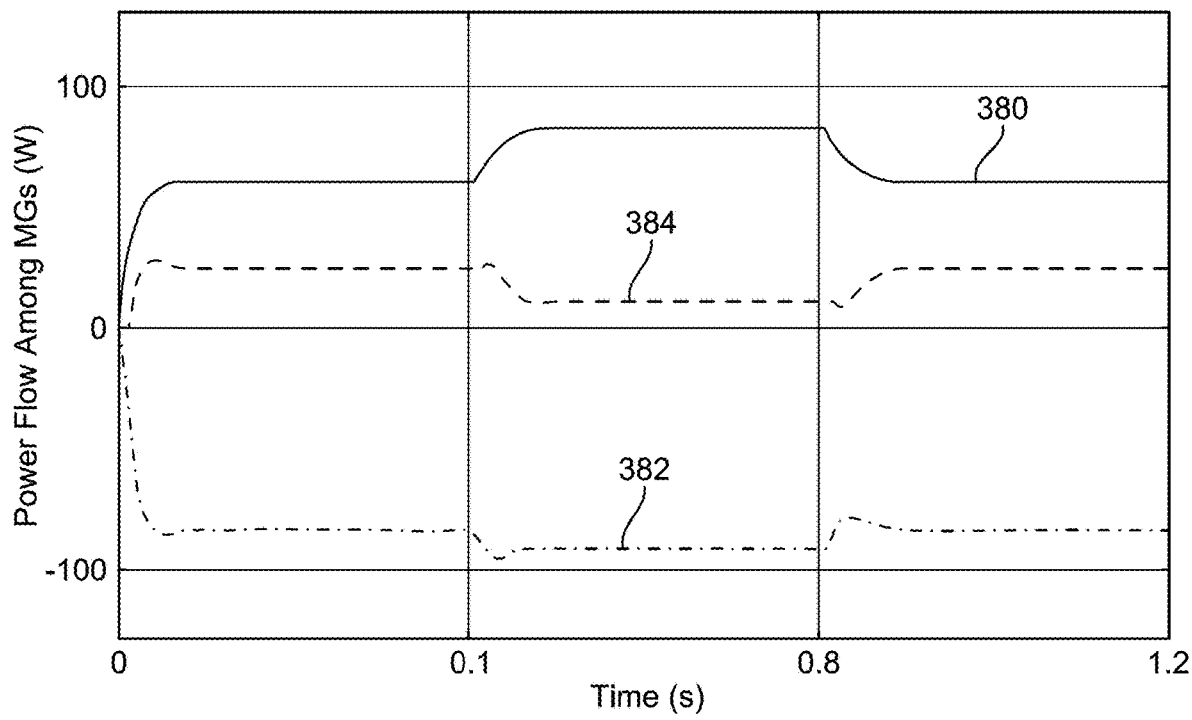
FIG. 3J is a graph illustrating inter-MG power flow under dynamic load scenarios, according to certain embodiments.

FIG. 3J illustrates the inter-MG power flow trajectories. The curve P1→2P 380 indicates the power transferred from MG1 to MG2, P2→3 382 shows the power from MG2 to MG3, and P3→1 384 represents the reverse power exchange. The load variation at t=0.4 s prompts an increase in power transferred from MG1 to MG2 and MG3, stabilizing post-transient. Upon load reduction at t=0.8 s, the power flows realign to initial values. These transitions illustrate the real-time optimization conducted by the tertiary controller 206 in adjusting reference voltages and aligning power exchanges with minimum cost objectives.

Figure 4A:
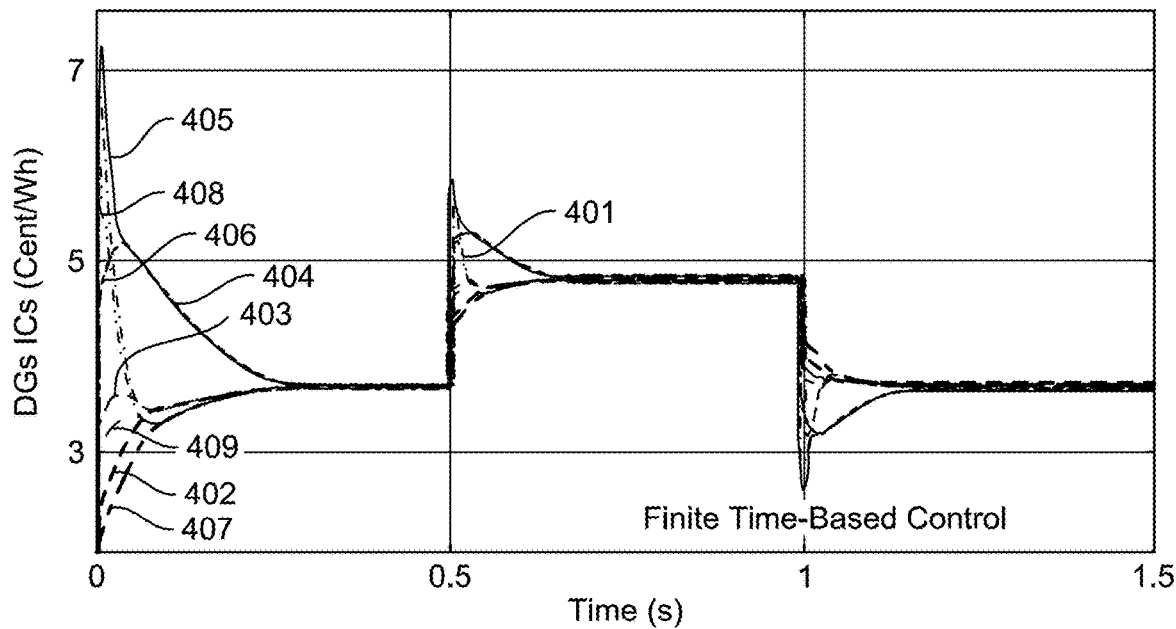
FIG. 4A is a graph illustrating DGU IC convergence under finite-time control, according to certain embodiments.

FIG. 4A illustrates the behavior of DGU incremental costs (ICs) under a finite-time control strategy. The graph presents a set of nine curves, each corresponding to an individual DGU IC across three microgrids. Specifically, curve 401 represents the IC 21,1, curve 402 represents 21,2, and curve 403 represents 20,3. Likewise, curves 404 represents 22,1, curve 405 represents 22,2, and curve 406 represents 22,3, curve 407 represents 23,1, curve 408 represents 23,2, and curve 409 represents 23,3. Initially, the ICs are unaligned and respond to step changes in demand at 0.5 seconds and 1.0 seconds. The finite-time controller aligns the ICs across all DGUs at approximately 0.29 seconds after each disturbance, demonstrating convergence to a common value but with visible overshoots and oscillations around the steady-state operating point. The graph exhibits the finite-time strategy's ability to enforce synchronization within a bounded timeframe, albeit without guaranteed tracking within predefined bounds.

Figure 4B:
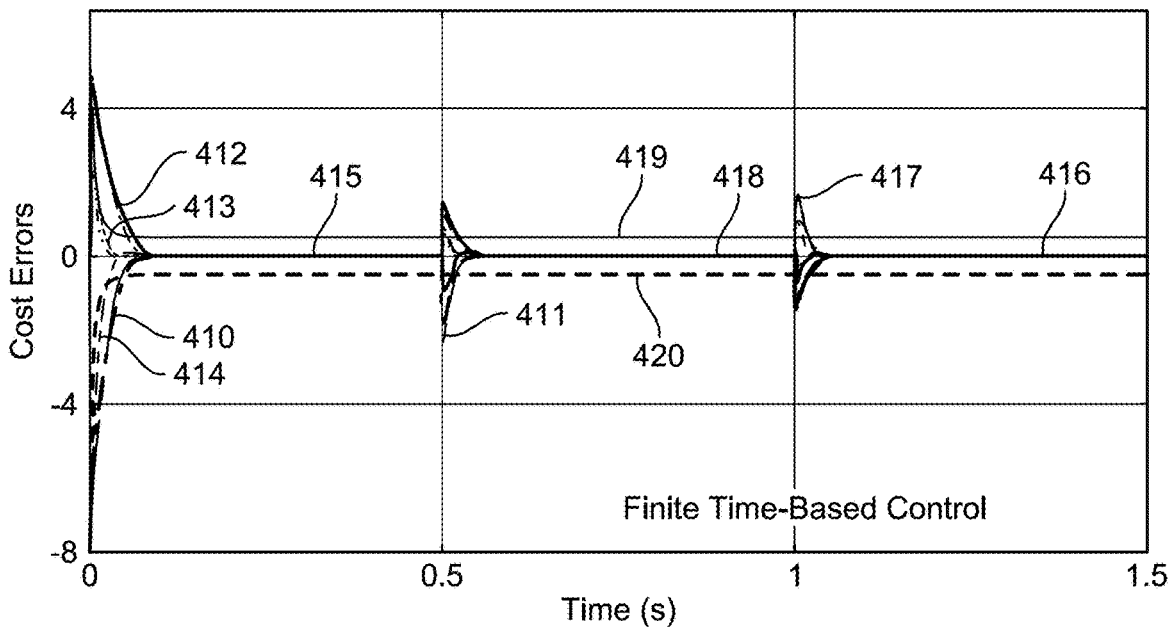
FIG. 4B is a graph illustrating cost tracking errors under finite-time control, according to certain embodiments.

FIG. 4B illustrates the cost tracking error response of the finite-time control strategy for each DGU. The cost error curve 410 represents $e^c_{1,1}$, curve 411 represents $e^c_{1,2}$, curve 412 represents $e^c_{1,3}$, curve 413 represents $e^c_{2,1}$, curve 414 represents $e^c_{2,2}$, curve 415 represents $e^c_{2,3}$, curve 416 represents $e^c_{3,1}$, curve 417 represents $e^c_{3,2}$, and curve 418 represents $e^c_{3,3}$. The upper and lower boundaries of the prescribed performance envelope for cost error, denoted as $\rho^{-c}$ 419 and $\rho\_^c$ 420. The graph indicates that while the finite-time controller enforces convergence, the cost errors significantly violate the prescribed bounds immediately following each disturbance at 0.5 seconds and 1.0 seconds. The inability of the control strategy to maintain tracking errors within performance limits emphasizes the limitations of the finite-time approach in applications requiring tight constraint satisfaction.

Figure 4C:
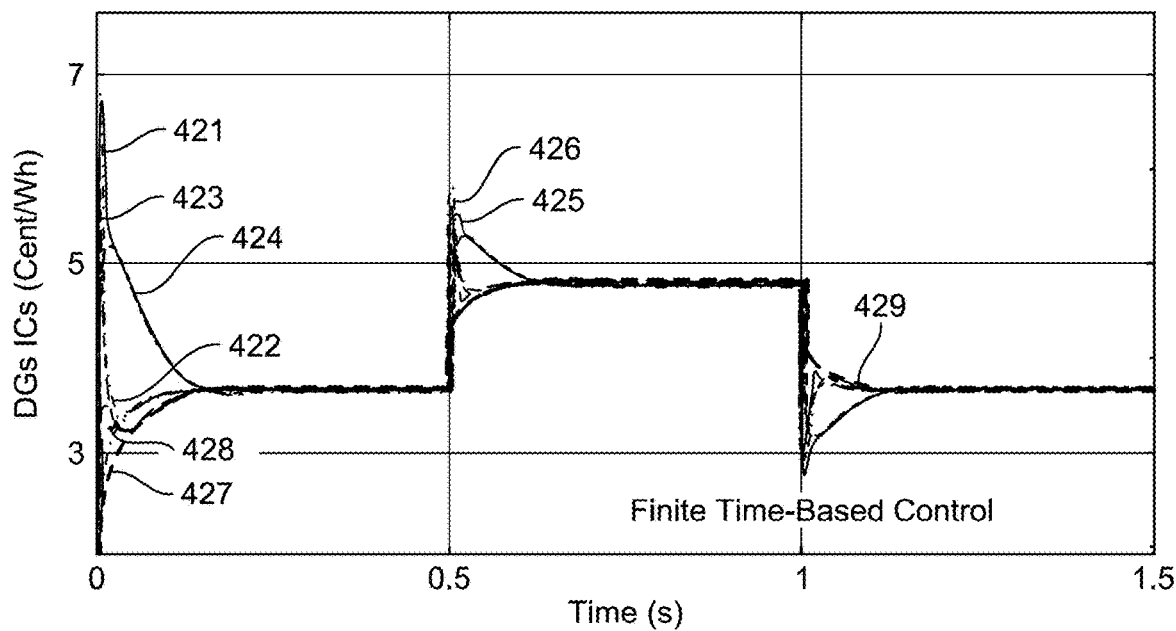
FIG. 4C is a graph illustrating DGU IC convergence under fixed-time control, according to certain embodiments.

FIG. 4C illustrates the IC trajectories of the DGUs under a fixed-time control scheme. Curves 421 represents the ICs 21,1, curve 422 represents 21,2 curve 423 represents 21,3, curve 424 represents $\lambda_{2,1}$, curve 425 represents $\lambda_{2,2}$, curve 426 represents $\lambda_{2,3}$, curve 427 represents $\lambda_{1,3}$, curve 428 represents $\lambda_{2,3}$, and curve 429 represents $\lambda_{3,3}$. The fixed-time control ensures faster convergence of the ICs across DGUs compared to finite-time control, with all ICs synchronizing at a common value approximately within 0.2 seconds following load transitions. The flat convergence behavior and reduced delay illustrate the benefit of fixed-time control in reducing latency during IC equalization. However, the IC values still deviate momentarily following each load shift, revealing transient instability during recovery.

Figure 4D:
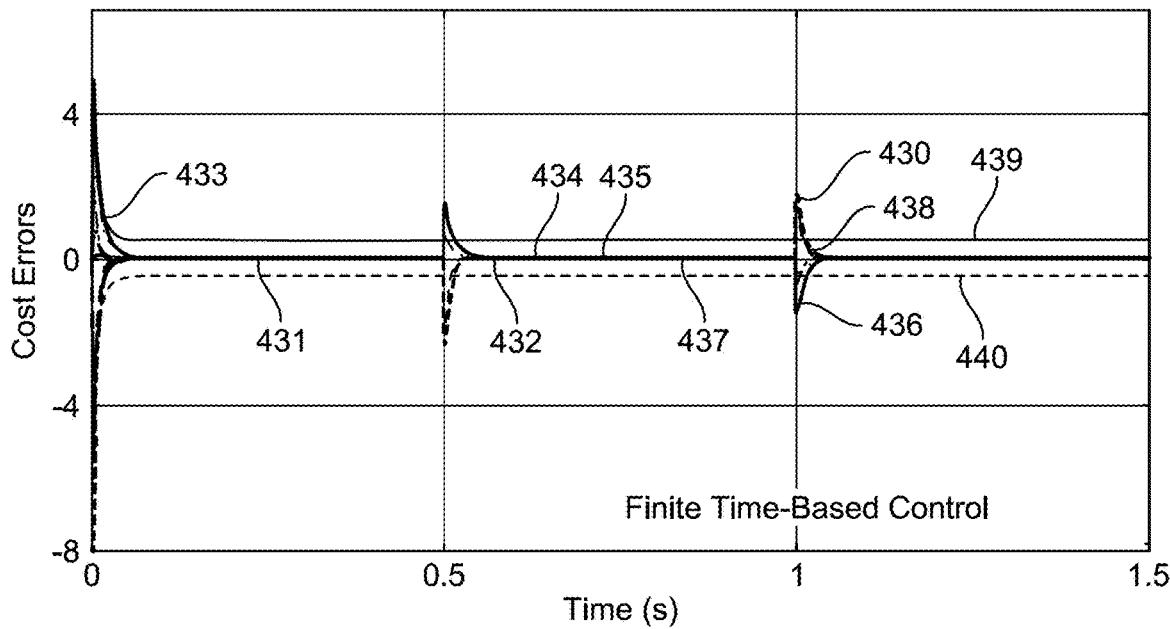
FIG. 4D is a graph illustrating cost tracking errors under fixed-time control, according to certain embodiments.

FIG. 4D depicts the cost tracking error curves for the fixed-time control case. Curves 430 represents the cost error $e_{1,1}^c$, curve 431 represents the cost error $e_{1,2}^c$, curve 432 represents the cost error $e_{1,3}^c$, curves 433 represents the cost error $e_{2,1}^c$, curve 434 represents the cost error $e_{2,2}^c$, curve 435 represents the cost error $e_{2,3}^c$, curves 436 represents the cost error $e_{3,1}^c$, curve 437 represents the cost error $e_{3,2}^c$, and curve 438 represents the cost error $e_{3,3}^c$.

Curves 439 represents the upper performance boundary and curve 440 represents lower prescribed performance boundary. Despite improved IC convergence speed, the cost errors exceed the allowed performance bounds during transient intervals, particularly after load variations at 0.5 seconds and 1.0 seconds. These deviations underscore the insufficiency of fixed-time methods in applications requiring guaranteed bounded tracking error performance, especially under dynamic system conditions.

Figure 4E:
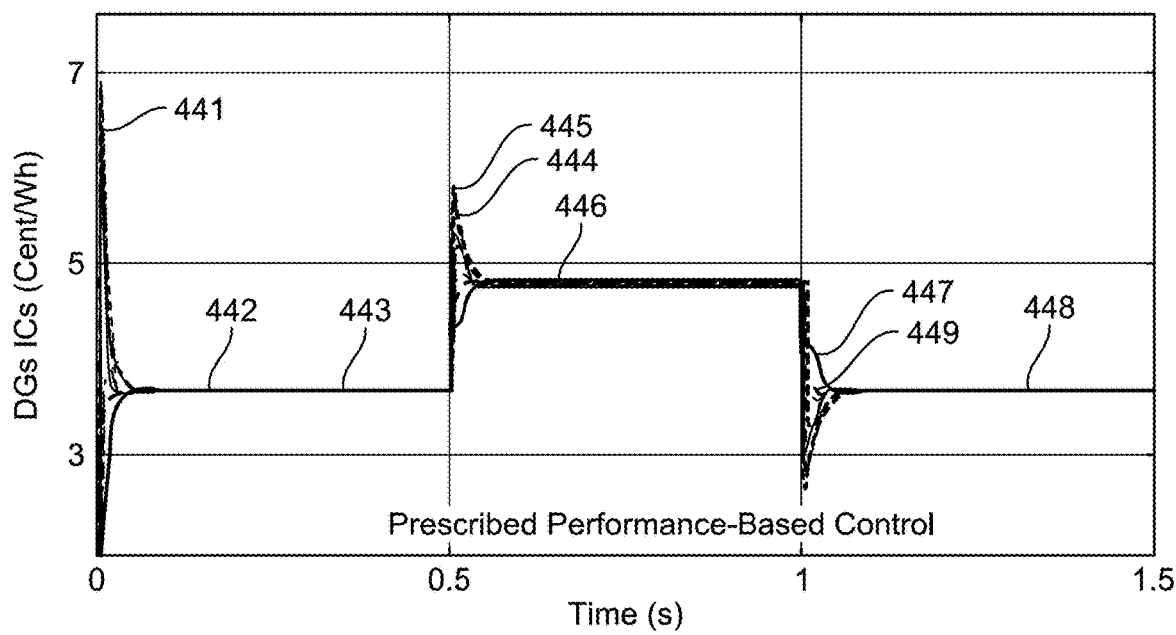
FIG. 4E is a graph illustrating DGU IC convergence under PP-PDT control, according to certain embodiments.

FIG. 4E presents the IC evolution of all DGUs under the proposed Prescribed Performance-based Predefined Time (PP-PDT) control strategy. Curve 441 represents $\lambda_{1,1}$, curve 442 represents $\lambda_{1,2}$, curve 443 represents $\lambda_{1,3}$, curve 444 represents $\lambda_{2,1}$, curve 445 represents $\lambda_{2,2}$, curve 446 represents $\lambda_{2,3}$, curve 447 represents $\lambda_{3,1}$, curve 448 represents $\lambda_{3,2}$, and curve 449 represents $\lambda_{3,3}$. The PP-PDT controller enforces convergence within 0.07 seconds after each system disturbance, achieving the fastest IC alignment compared to the finite-time and fixed-time controllers. Moreover, the convergence is smooth and strictly monotonic without overshoot, validating the robustness and constraint-respecting nature of the PP-PDT strategy. Each IC trajectory reaches a consensus at the prescribed global optimum in a predefined settling time, independent of initial conditions or the nature of the disturbance.

Figure 4F:
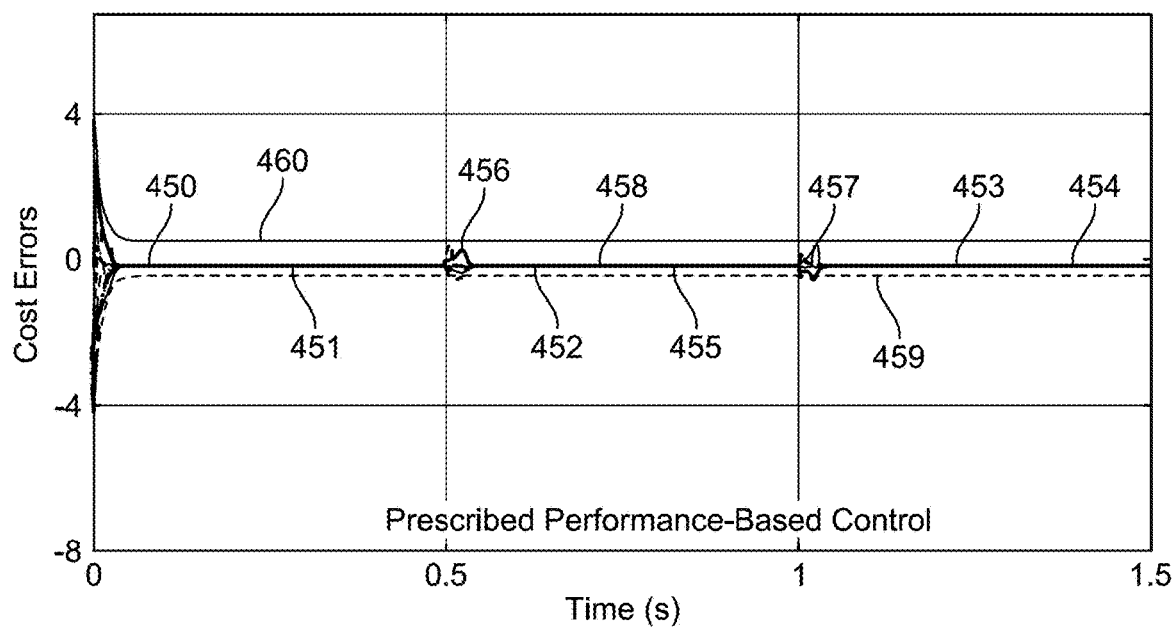
FIG. 4F is a graph illustrating cost tracking errors under PP-PDT control, according to certain embodiments.

FIG. 4F illustrates the cost tracking errors of the DGUs under the PP-PDT controller. Curves 450 represents the transformed cost errors $e_{1,1}^c$, curve 451 represents the transformed cost errors $e_{1,2}^c$, curve 452 represents the transformed cost errors $e_{1,3}^c$, curves 453 represents the transformed cost errors $e_{2,1}^c$, curve 454 represents the transformed cost errors $e_{2,2}^c$, curve 455 represents the transformed cost errors $e_{2,3}^c$, curves 456 represents the transformed cost errors $e_{3,1}^c$, curve 457 represents the transformed cost errors $e_{3,2}^c$, and curve 458 represents the transformed cost errors $e_{3,3}^c$. Curve 459 denotes prescribed upper bounds of the error envelope, $p^{-c}$ and curve 460 denotes lower bounds of the error envelope $\rho\_^c$. The figure demonstrates that each cost error remains strictly confined within the prescribed performance limits throughout the entire operation, including the transient phases induced by load changes at 0.5 seconds and 1.0 seconds. The zero-steady-state error, absence of overshoot, and predefined-time convergence validate the effectiveness of the PP-PDT controller in ensuring both optimal economic dispatch and dynamic constraint satisfaction.

Figure 5A:
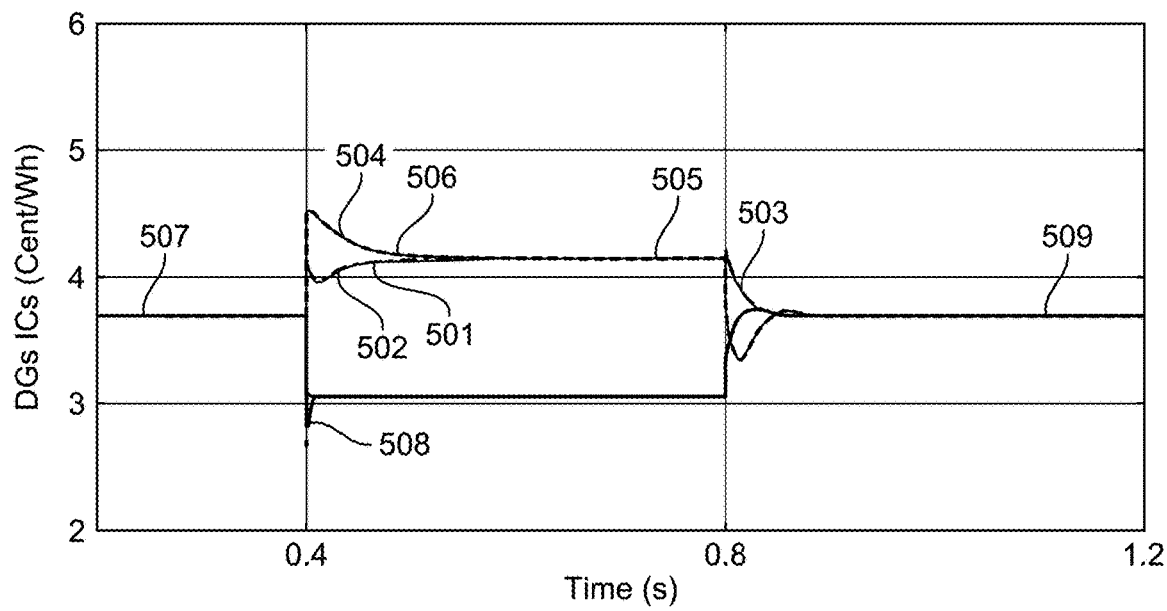
FIG. 5A is a graph illustrating DGU IC behavior during plug-and-play operations, according to certain embodiments.

FIG. 5A illustrates the convergence behavior of incremental costs (ICs) of distributed generation units (DGUs) during a plug-and-play operation scenario. Curve 501 represents $\lambda_{1,1}$, curve 502 represents $\lambda_{1,2}$, curve 503 represents $\lambda_{1,3}$, curve 504 represents $\lambda_{2,1}$, curve 505 represents $\lambda_{2,2}$, curve 506 represents $\lambda_{2,3}$, curve 507 represents $\lambda_{3,1}$, curve 508 represents $\lambda_{3,2}$, and curve 509 represents $\lambda_{3,3}$.

At time t=0.4 s, $MG_3$ is disconnected from the global cluster, resulting in a divergence of its DGU ICs from those of $MG_1$ and $MG_2$. The ICs of DGUs within $MG_1$ and $MG_2$ converge to a new global optimal value within the prescribed settling time. In contrast, the ICs of $MG_3$'s DGUs converge to a locally optimal value reflecting autonomous control operation in islanded mode. Upon reconnection of $MG_3$ at t=0.8 s, the ICs realign to a common global optimum, demonstrating the system's plug-and-play convergence capability.

Figure 5B:
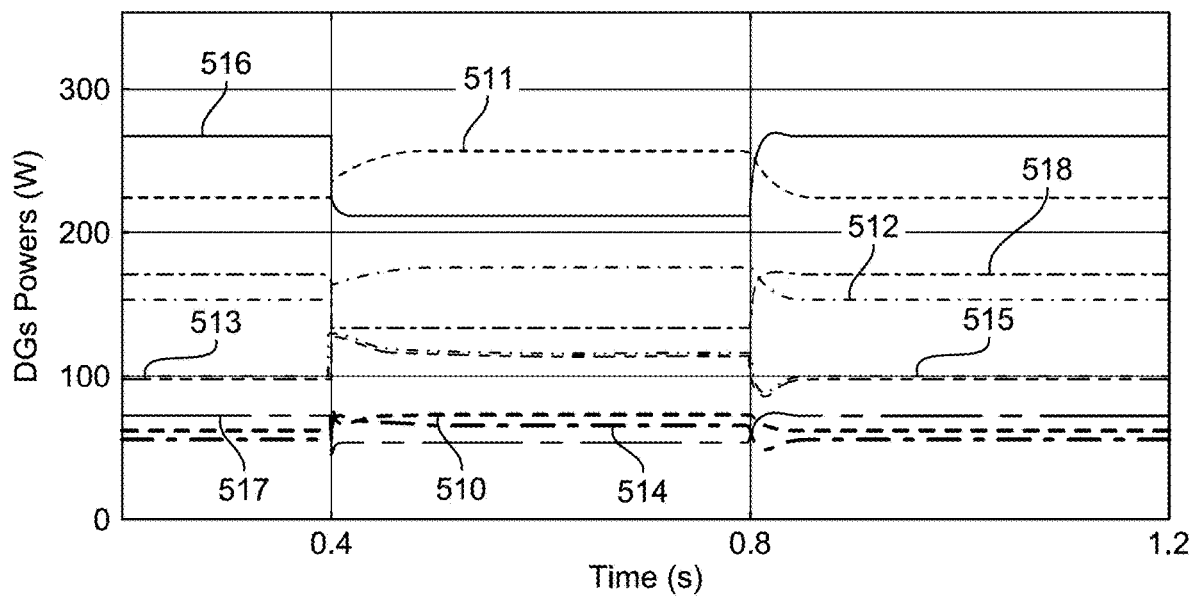
FIG. 5B is a graph illustrating DGU power outputs during MG plug-and-play events, according to certain embodiments.

FIG. 5B depicts the real power output of individual DGUs during the plug-and-play scenario. The power outputs include $P_{1,1}$ represented by curve 510, $P_{1,2}$ represented by curve 511, $P_{1,3}$ represented by curve 512, $P_{2,1}$ represented by curve 513, $P_{2,2}$ represented by curve 514, $P_{2,3}$ represented by curve 515, $P_{3,1}$ represented by curve 516, $P_{3,2}$ represented by curve 517, and $P_{3,3}$ represented by curve 518.

Prior to t=0.4 s, all DGUs operate under globally coordinated economic dispatch. Following the disconnection of $MG_3$, its DGUs adjust their power generation to support local demand, reflecting autonomous local optimization. During this interval, the power outputs of $MG_1$ and $MG_2$ are redistributed to maintain global load-generation balance. At t=0.8 s, the reconnection of $MG_3$ results in coordinated realignment of power outputs across all DGUs, restoring the original power-sharing configuration governed by the PP-PDT controller.

Figure 5C:
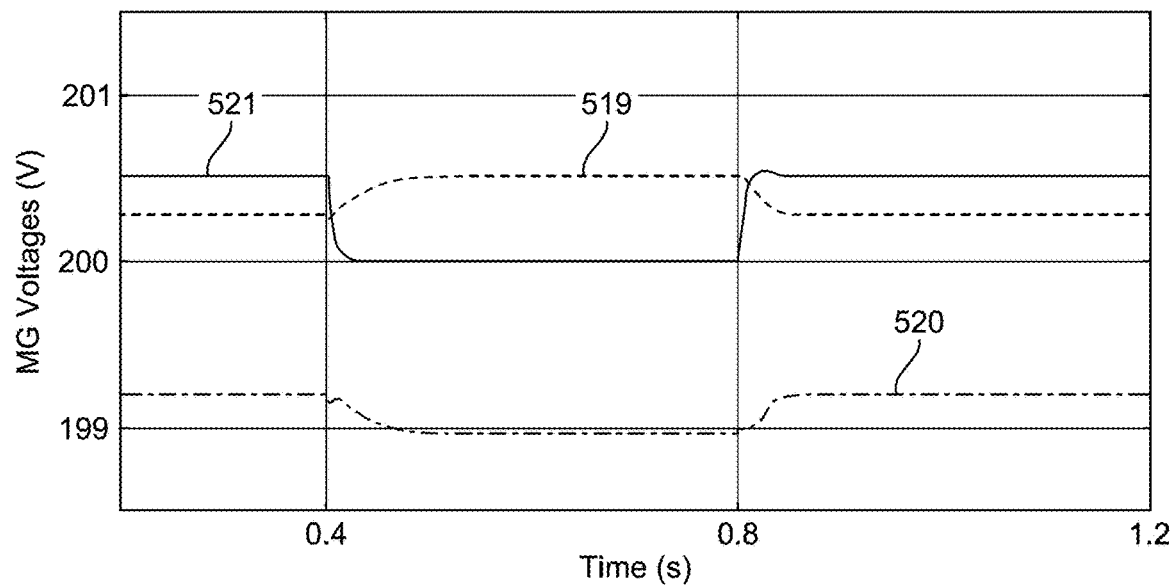
FIG. 5C is a graph illustrating MG average voltage profiles during plug-and-play operations, according to certain embodiments.

FIG. 5C illustrates the voltage profile of the average DC bus voltages of $MG_1$, $MG_2$, and $MG_3$. Curve 519 represents $V_1^{avg}$, curve 520 represents $V_2^{avg}$, and curve 521 represents $V_3^{avg}$. At t=0.4 s, $MG_3$ is decoupled from the rest of the system, and its average bus voltage is independently regulated to 200 V by the secondary controller. $MG_1$ and $MG_2$ simultaneously adjust their reference voltage setpoints to compensate for the loss of power contribution from $MG_3$. The average voltages remain stable within the prescribed performance bounds throughout the disconnection and reconnection periods, demonstrating the voltage regulation capabilities of the distributed PP-PDT voltage regulator.

Figure 5D:
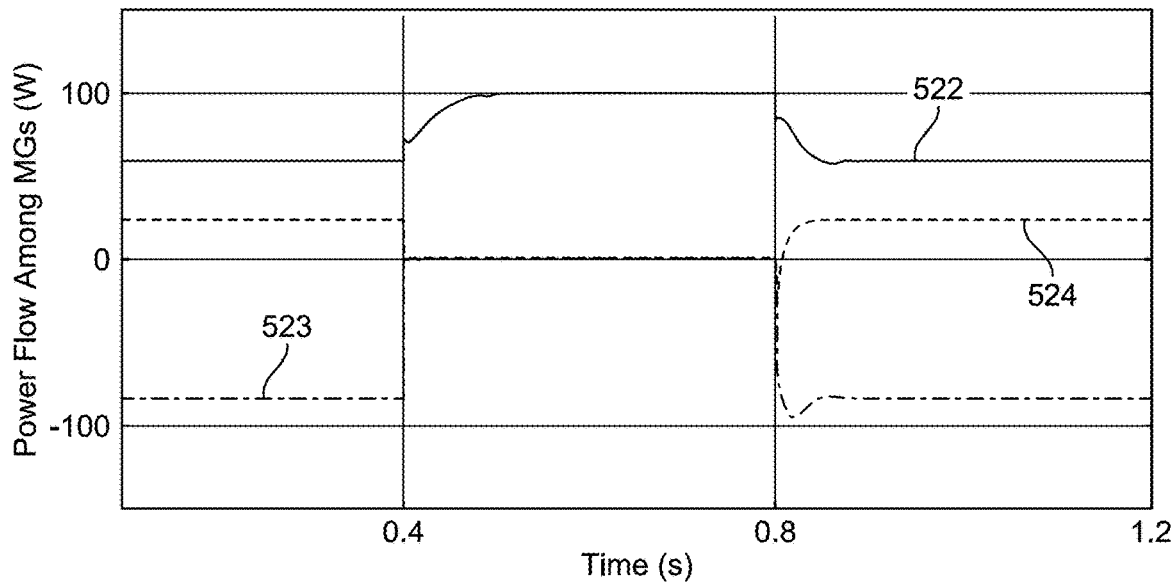
FIG. 5D is a graph illustrating inter-MG power flow during plug-and-play events, according to certain embodiments.

FIG. 5D illustrates the power flow exchange among microgrids during the plug-and-play event. The plotted curves include power transfer from $MG_1$ to $MG_2$, P1→2 represented by 522, from $MG_2$ to $MG_3$, P2→23 represented by 523, and from $MG_3$ to $MG_1$, P3→1 represented by 524. Upon disconnection of $MG_3$ at t=0.4 s, the power flow P2→3 and P3→1 drop to zero, indicating a loss of power exchange with $MG_3$. The remaining power transfers between $MG_1$ and $MG_2$ are automatically adjusted by the tertiary controller to maintain balance. When $MG_3$ is reconnected at t=0.8 s, all inter-MG power flows are restored, indicating re-establishment of the global power-sharing configuration. The transitions are smooth and confined within prescribed performance envelopes, demonstrating stability and responsiveness of the hierarchical PP-PDT control framework under dynamic network topology changes.

Figure 6A:
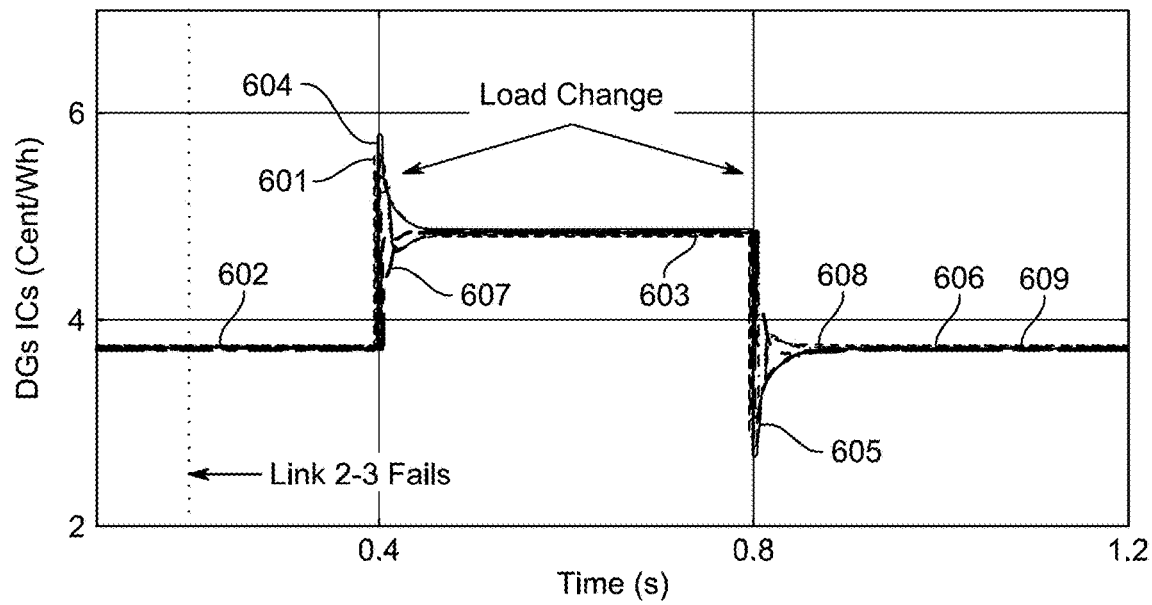
FIG. 6A is a graph illustrating DGU IC trajectories under cyber link failure conditions, according to certain embodiments.

FIG. 6A illustrates the dynamic response of the instantaneous costs (ICs) of a plurality of distributed generation units (DGUs) under the influence of a cyber link failure between $MG_2$ and $MG_3$ at time t=0.2 s. The curves include IC values $\lambda_{1,1}$ represented by curve 601, $\lambda_{1,2}$ represented by curve 602, $\lambda_{1,3}$ represented by curve 603, $\lambda_{2,1}$ represented by curve 604, $\lambda_{2,2}$ represented by curve 605, $\lambda_{2,3}$ represented by curve 606, $\lambda_{3,1}$ represented by curve 607, $\lambda_{3,2}$ represented by curve 608, and $\lambda_{3,3}$ represented by curve 609.

Prior to the communication failure, all DGUs within the interconnected microgrid clusters exhibit synchronized IC values, indicating consensus on economic power sharing. At t=0.2 s, the failure of the communication link between $MG_2$ and $MG_3$ introduces a disturbance in coordination. However, the proposed PP-PDT controller re-stabilizes the IC trajectories rapidly, re-establishing consensus within the prescribed performance boundaries. The IC trajectory $\lambda_{3,1}$, curve 607, momentarily deviates in response to the loss of connectivity but realigns through local optimization within $MG_3$, demonstrating the system's plug-and-play robustness under cyber failure conditions.

Figure 6B:
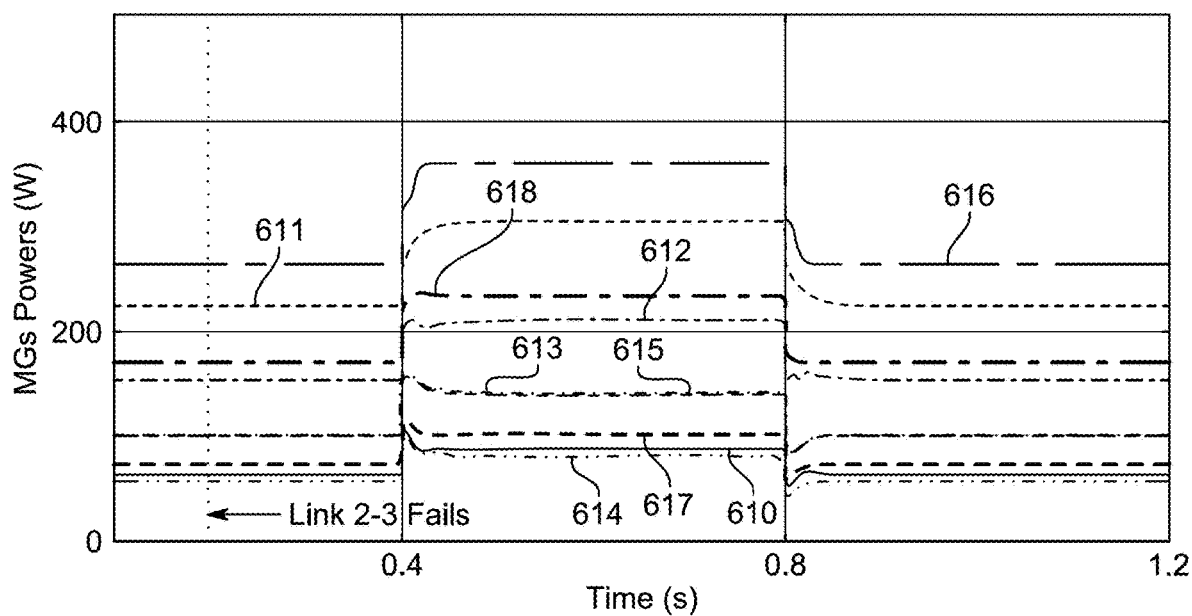
FIG. 6B is a graph illustrating DGU power outputs during cyber link failure between MGs, according to certain embodiments.

FIG. 6B presents the corresponding power outputs of the DGUs during the cyber link disruption. The active power values include $P_{1,1}$ represented by curve 610, $P_{1,2}$ represented by curve 611, $P_{1,3}$ represented by curve 612, $P_{2,1}$ represented by curve 613, $P_{2,2}$ represented by curve 614, $P_{2,3}$ represented by curve 615, $P_{3,1}$ represented by curve 616, $P_{3,2}$ represented by curve 617, and $P_{3,3}$ represented by curve 618.

At steady state prior to failure, the power values across the DGUs are allocated optimally. When the link between $MG_2$ and $MG_3$ fails at t=0.2 s, $MG_3$ operates in isolation, resulting in local redistribution of its internal power supply. The power output of $P_{3,1}$, curve 616, is notably constrained at its upper bound, demonstrating local saturation. Other power values including $P_{2,1}$, curve 613, and $P_{1,1}$, curve 610, undergo marginal adjustments to compensate for the power imbalance while retaining inter-cluster economic dispatch through remaining cyber links. This demonstration validates the controller's ability to achieve autonomous sub-cluster balancing while sustaining global optimization in the rest of the network.

Figure 6C:
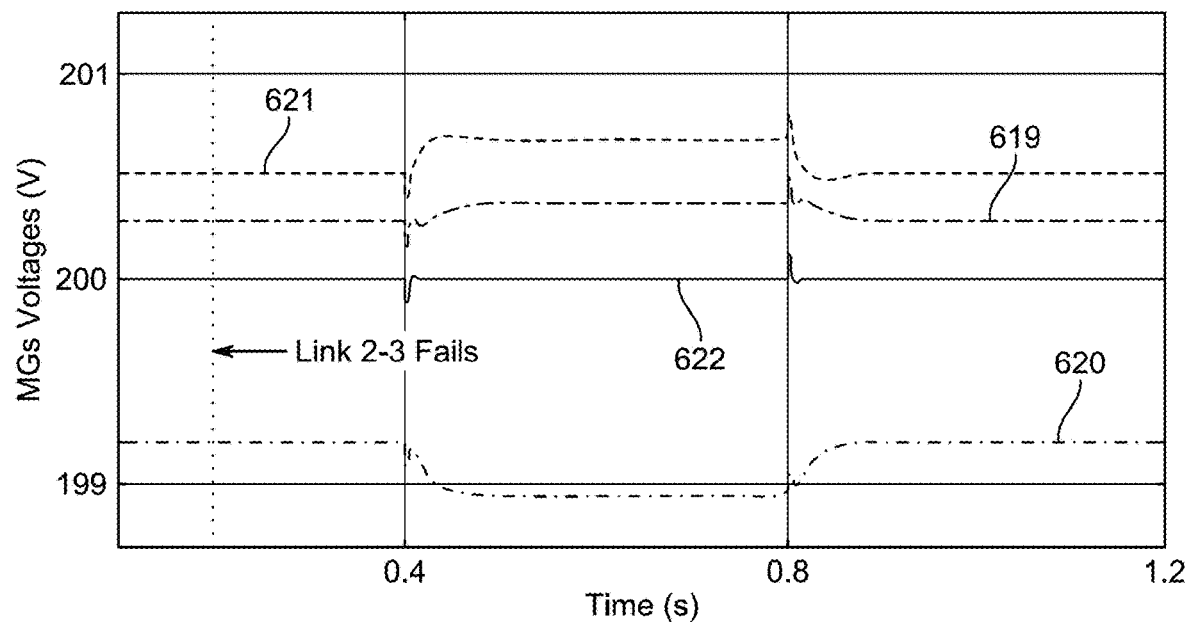
FIG. 6C is a graph illustrating MG average voltage profiles under cyber link failure, according to certain embodiments.

FIG. 6C shows the evolution of average voltage values across the microgrid clusters MG1, MG2, and MG3. Curve 619 represents $V_1^{avg}$, curve 620 represents $V_2^{avg}$, and curve 621 represents $V_3^{avg}$. Before the cyber link failure at t=0.2 s, all MGs operate at an average bus voltage of approximately 200 V. Following the disconnection, $V_3^{avg}$, curve 621, momentarily deviates but is rapidly restored to 200 V through the local secondary voltage regulator. The voltages $V_1^{avg}$ and $V_2^{avg}$ show minimal disturbance due to preserved communication between $MG_1$ and $MG_2$. This graph thus demonstrates that even in isolated conditions, the distributed PP-PDT voltage regulator can stabilize average voltages within a predefined settling time, rendering voltage stability and local load support.

Figure 6D:
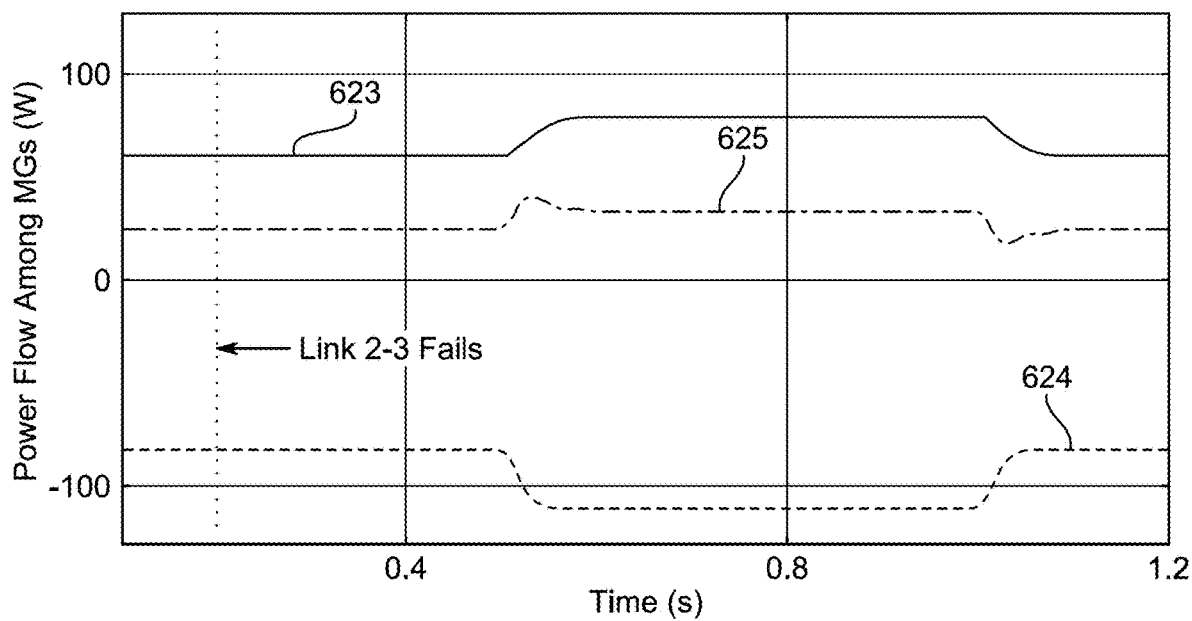
FIG. 6D is a graph illustrating inter-MG power exchange during cyber link failures, according to certain embodiments.

FIG. 6D illustrates the real-time power exchange among MGs. The plotted curves include power transfer from $MG_1$ to $MG_2$, P1→2 represented by 622, from $MG_2$ to $MG_3$, P2→23 represented by 623, and from $MG_3$ to $MG_1$, P3→1 represented by 624. Curve 623 shows a sharp drop to zero at t=0.2 s, marking the failure of the cyber communication link between $MG_2$ and $MG_3$. In response, curve 622 and curve 624 exhibit corrective adaptations to reroute the power flow, thereby minimizing the impact on global total generation cost (TGC). The real-time reconfiguration of inter-MG power exchange following link failure emphasizes the controller's adaptive routing and robust economic dispatch capabilities.

Figure 7A:
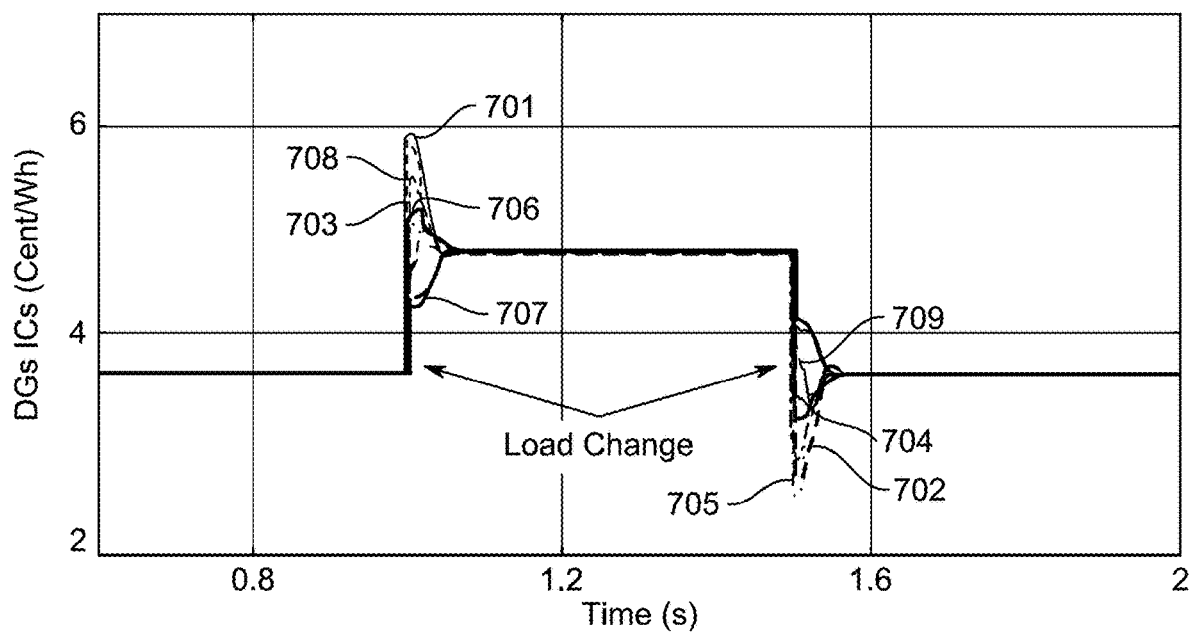
FIG. 7A is a graph illustrating DGU IC convergence under a 5 ms communication delay, according to certain embodiments.

FIG. 7A illustrates the time-series response of distributed generator units (DGUs) instantaneous costs (ICs) under a 5-millisecond communication delay scenario. The curves include IC values $\lambda_{1,1}$ represented by curve 701, $\lambda_{1,2}$ represented by curve 702, $\lambda_{1,3}$ represented by curve 703, $\lambda_{2,1}$ represented by curve 704, $\lambda_{2,2}$ represented by curve 705, $\lambda_{2,3}$ represented by curve 706, $\lambda_{3,1}$ represented by curve 707, $\lambda_{3,2}$ represented by curve 708, and $\lambda_{3,3}$ represented by curve 709. All DGUs converge to the same optimal IC value of approximately 4.4 ¢/W·h within 0.1 seconds following a load disturbance at t=1.0 seconds. Despite the presence of the delay, the ICs remain within the prescribed performance boundaries, showcasing rapid consensus and robustness of the PP-PDT controller. Notably, the transition period exhibits no overshoot or instability, affirming control reliability under minor cyber latency.

Figure 7B:
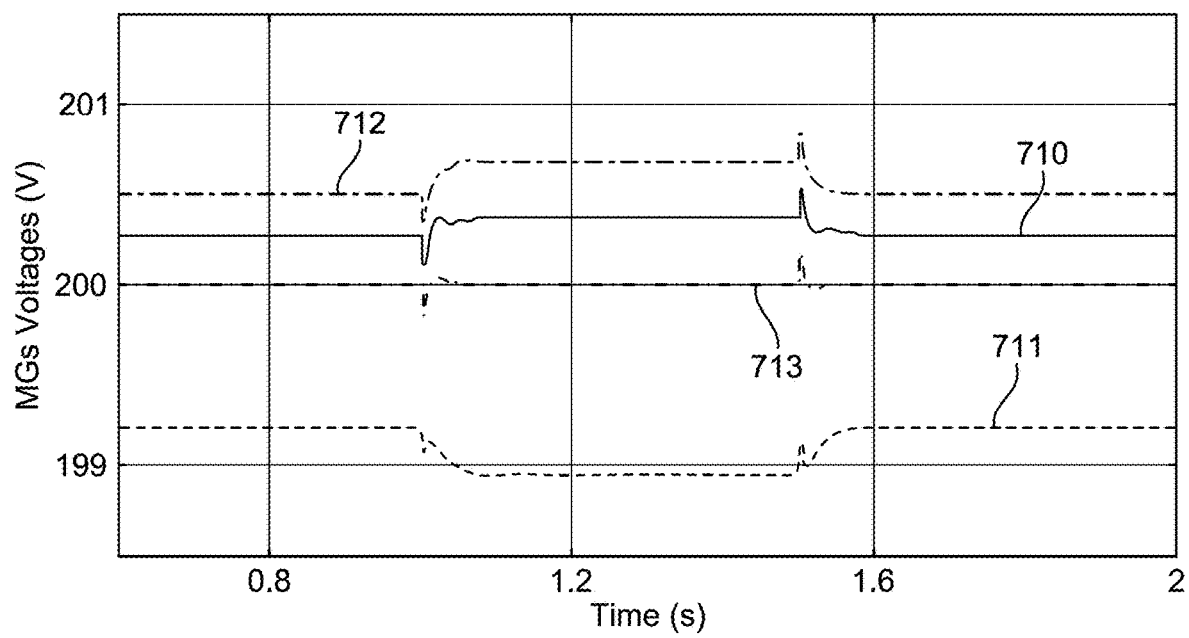
FIG. 7B is a graph illustrating MG voltage profiles under a 5 ms communication delay, according to certain embodiments.

FIG. 7B depicts the voltage dynamics of the microgrids (MGs) under the same 5-millisecond delay scenario. The MG voltage curves include curve 710 representing $V_1^{avg}$, curve 711 representing $V_2^{avg}$, and curve 712 representing $V_3^{avg}$, and curve 713 representing the global average voltage $V^{avg}$. Upon load perturbation at t=1.0 seconds, the MGs temporarily deviate from the nominal 200 V level. However, the voltage regulator ensures that each MG returns to its respective reference voltage within 0.1 seconds, and the system-wide average voltage converges to 200 V. The minor deviation of approximately 1V confirms fast voltage restoration with no visible oscillations, indicating the secondary controller's efficacy in preserving voltage stability despite communication lag.

Figure 7C:
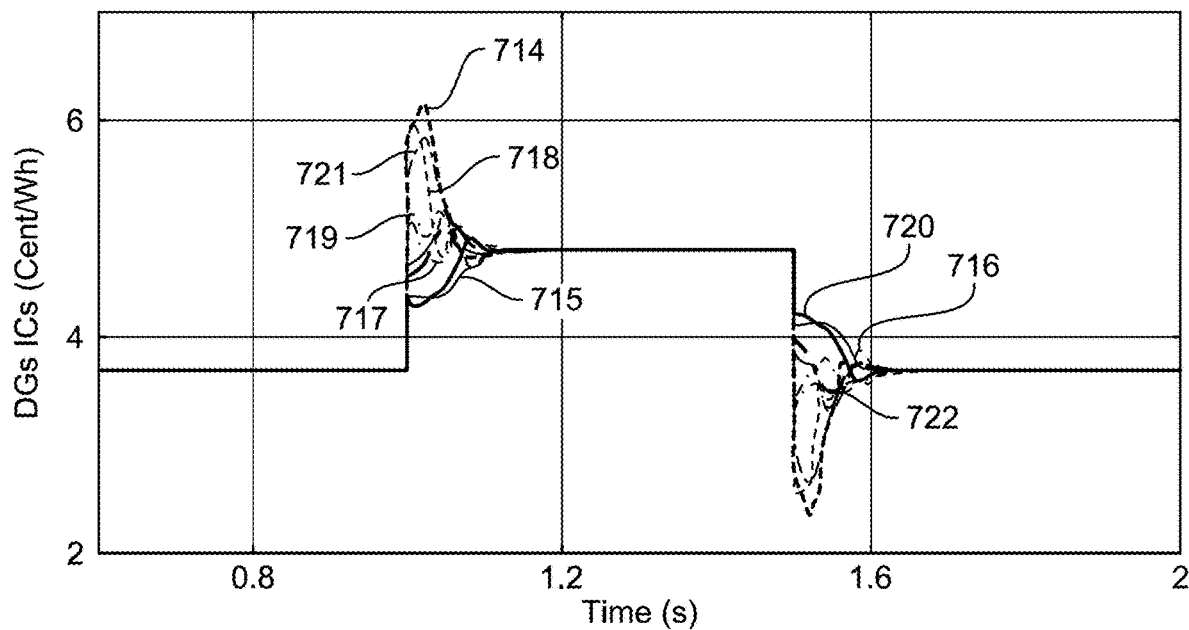
FIG. 7C is a graph illustrating DGU IC convergence under a 20 ms communication delay, according to certain embodiments.

FIG. 7C illustrates the convergence behavior of the DGUs' ICs under an increased communication delay of 20 milliseconds. The curves include IC values $\lambda_{1,1}$ represented by curve 714, $\lambda_{1,2}$ represented by curve 715, $\lambda_{1,3}$ represented by curve 716, $\lambda_{2,1}$ represented by curve 717, $\lambda_{2,2}$ represented by curve 718, $\lambda_{2,3}$ represented by curve 719, $\lambda_{3,1}$ represented by curve 720, $\lambda_{3,2}$ represented by curve 721, and $\lambda_{3,3}$ represented by curve 722.

As shown, convergence time increases slightly to 0.15 seconds following a load change at t=1.0 seconds. Minor fluctuations appear before settling, but the PP-PDT algorithm maintains bounded performance, and all ICs ultimately reach the shared optimum value, thereby ensuring optimal power dispatch under moderate network delays.

Figure 7D:
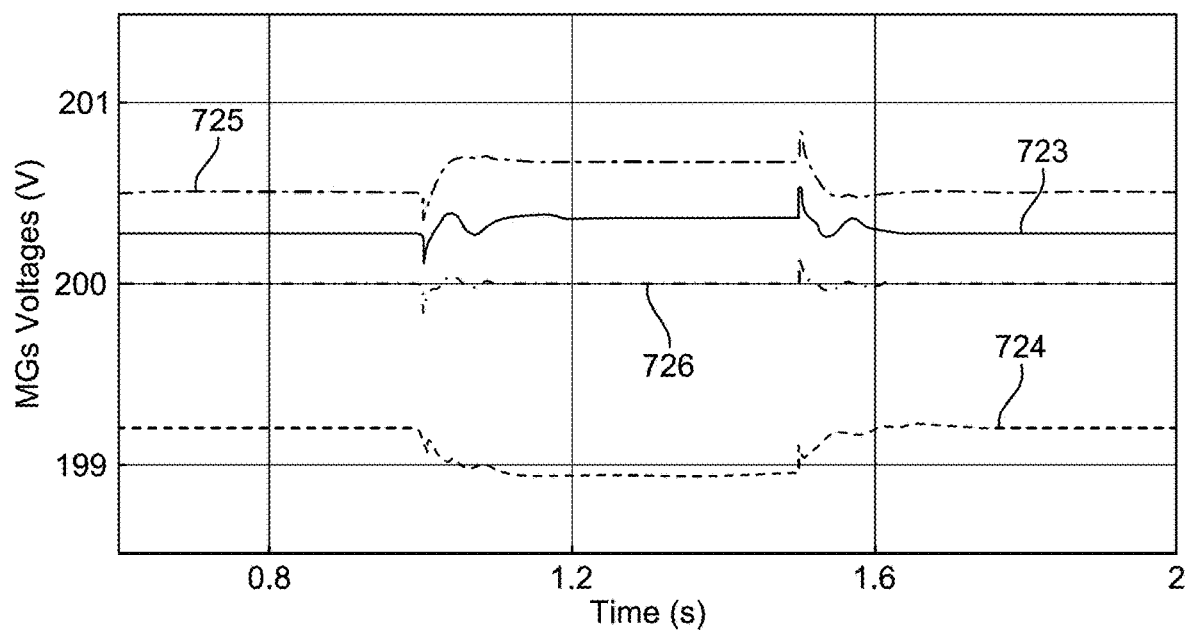
FIG. 7D is a graph illustrating MG voltage profiles under a 20 ms communication delay, according to certain embodiments.

FIG. 7D presents the voltage restoration profiles of the MGs corresponding to the 20-millisecond delay scenario. The MG voltage curves include curve 723 representing $V_1^{avg}$, curve 724 representing $V_2^{avg}$, and curve 725 representing $V_3^{avg}$, and curve 726 representing the global average voltage $V^{avg}$. A slight delay in response is observed compared to the 5 ms case, with MG voltages initially dropping to approximately 198.7 V before recovery. The system-wide average voltage $V^{avg}$ follows a similar dip, but all voltages are stabilized to nominal values within the predefined performance bound and within approximately 0.2 seconds. These results validate the voltage regulator's robustness to longer latency, demonstrating the PP-PDT controller's tolerance to cyber-induced uncertainties.

The present disclosure introduces a two-layer prescribed performance-based predefined time (PP-PDT) control scheme configured to minimize the total generation cost (TGC) across a direct current (DC) multi-microgrid (MG) cluster. The secondary controller is implemented to align the incremental costs (ICs) of all distributed generation units (DGUs) within each MG and to restore the MG's average voltage to a predefined nominal reference within a user-specified settling time. This facilitates economic load distribution among the DGUs and ensures equilibrium between generation and demand within the MG cluster. In addition, the tertiary controllers are configured to dynamically adjust the reference voltages of the MGs in order to manage the inter-MG power exchange optimally and minimize the global TGC. A significant advantage of the proposed control system is its ability to maintain tracking errors within prescribed performance bounds and to eliminate such errors within an adjustable predefined time governed by a single control parameter. This configuration improves both transient and steady-state performance metrics of the system. The robustness of the proposed control framework is validated through comprehensive stability analysis and simulation studies. Furthermore, a comparative evaluation demonstrates that the proposed PP-PDT control scheme achieves superior performance in terms of convergence speed and tracking error containment when compared to existing methods.

Figure 8:
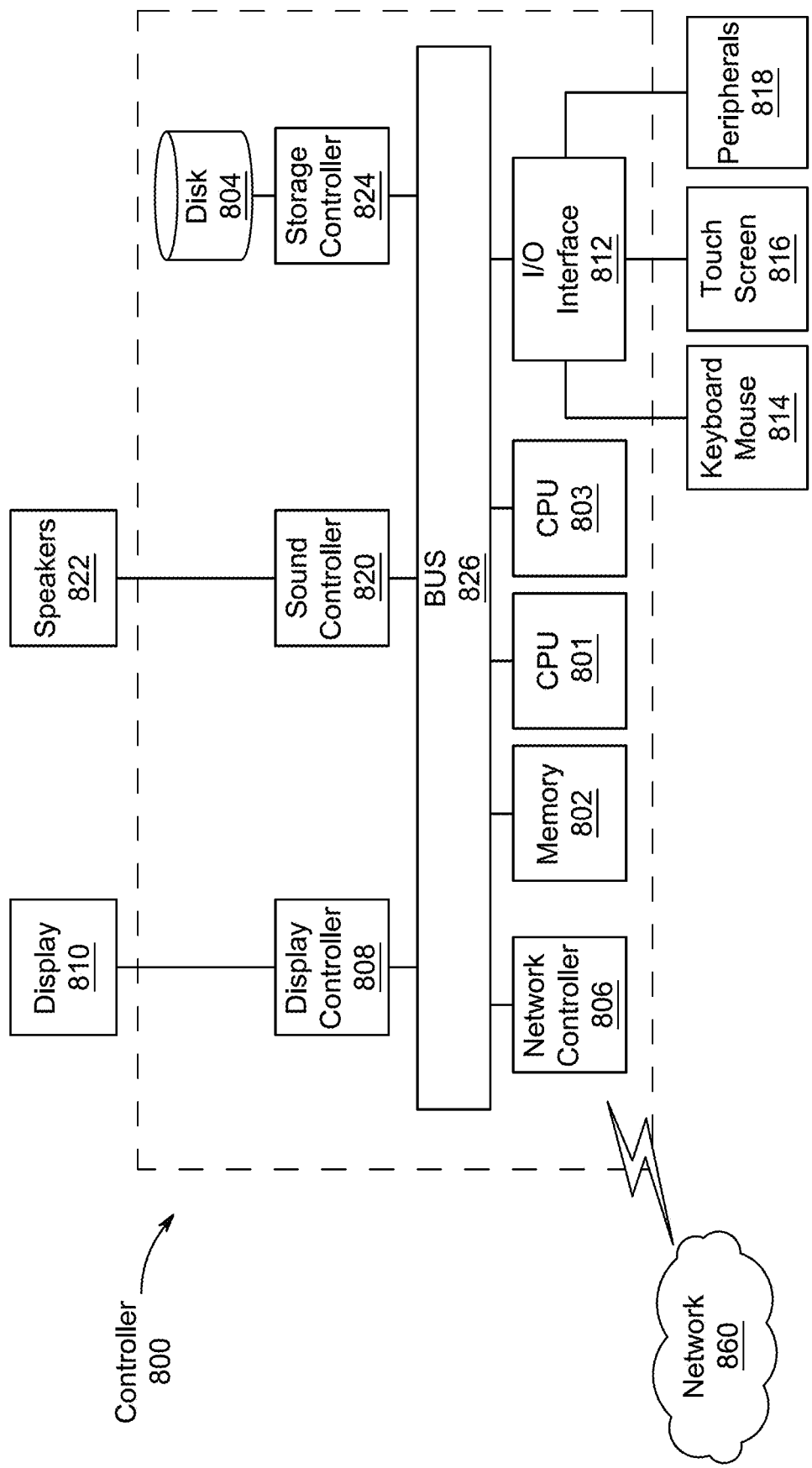
FIG. 8 is an illustration of a non-limiting example of details of computing hardware used in the computing system, according to certain embodiments.

Next, further details of the hardware description of the computing environment according to exemplary embodiments is described with reference to FIG. 8. In FIG. 8, a controller 800 is described as representative of the UVA system 100 of FIG. 1, in which the controller is a computing device that includes a CPU 801 which performs the processes described above/below.

The process data and instructions may be stored in memory 802. These processes and instructions may also be stored on a storage medium disk 804 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 801, 803 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 801 or CPU 803 may be a Xenon or Core processor from Intel of America or an Opteron processor from AMD of America, or may be other processor types that would be recognized by one of ordinary skill in the art. Alternatively, the CPU 801, 803 may be implemented on an FPGA, ASIC, PLD or using discrete logic circuits, as one of ordinary skill in the art would recognize. Further, CPU 801, 803 may be implemented as multiple processors cooperatively working in parallel to perform the instructions of the inventive processes described above.

The computing device in FIG. 8 also includes a network controller 806, such as an Intel Ethernet PRO network interface card from Intel Corporation of America, for interfacing with network 860. As can be appreciated, the network 860 can be a public network, such as the Internet, or a private network such as an LAN or WAN network, or any combination thereof and can also include PSTN or ISDN subnetworks. The network 860 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 808, such as a NVIDIA GeForce GTX or Quadro graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners, such as an OfficeJet or DeskJet from Hewlett Packard.

A sound controller 820 is also provided in the computing device such as Sound Blaster X-Fi Titanium from Creative, to interface with speakers/microphone 822 thereby providing sounds and/or music.

The general purpose storage controller 824 connects the storage medium disk 804 with communication bus 826, which may be an ISA, EISA, VESA, PCI, or similar, for interconnecting all of the components of the computing device. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 9.

Figure 9:
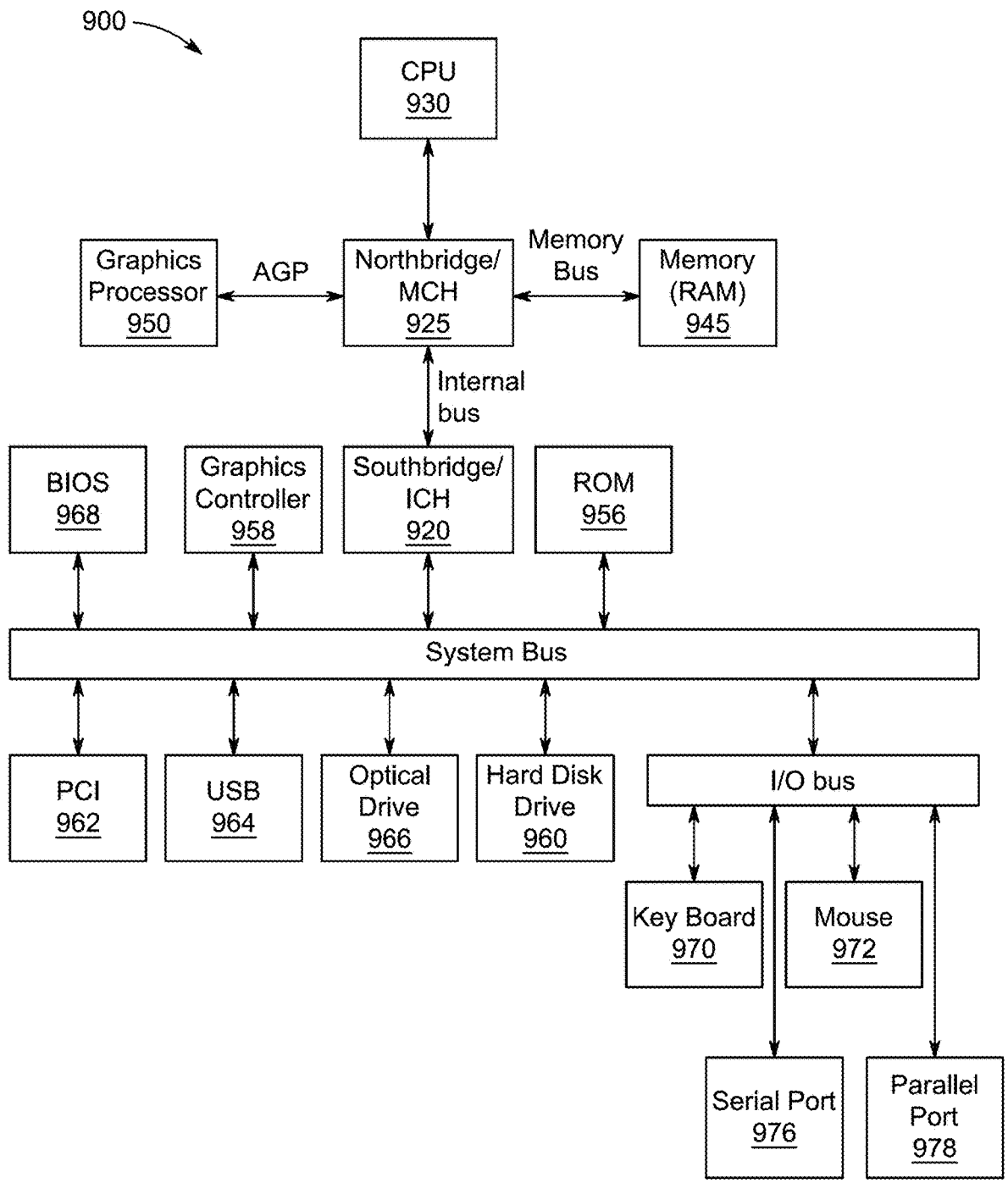
FIG. 9 is an exemplary schematic diagram of a data processing system used within the computing system, according to certain embodiments.

FIG. 9 shows a schematic diagram of a data processing system, according to certain embodiments, for performing the functions of the exemplary embodiments. The data processing system is an example of a computer in which code or instructions implementing the processes of the illustrative embodiments may be located.

In FIG. 9, data processing system 900 employs a hub architecture including a north bridge and memory controller hub (NB/MCH) 925 and a south bridge and input/output (I/O) controller hub (SB/ICH) 920. The central processing unit (CPU) 930 is connected to NB/MCH 925. The NB/MCH 925 also connects to the memory 945 via a memory bus, and connects to the graphics processor 950 via an accelerated graphics port (AGP). The NB/MCH 925 also connects to the SB/ICH 920 via an internal bus (e.g., a unified media interface or a direct media interface). The CPU Processing unit 930 may contain one or more processors and even may be implemented using one or more heterogeneous processor systems.

Figure 10:
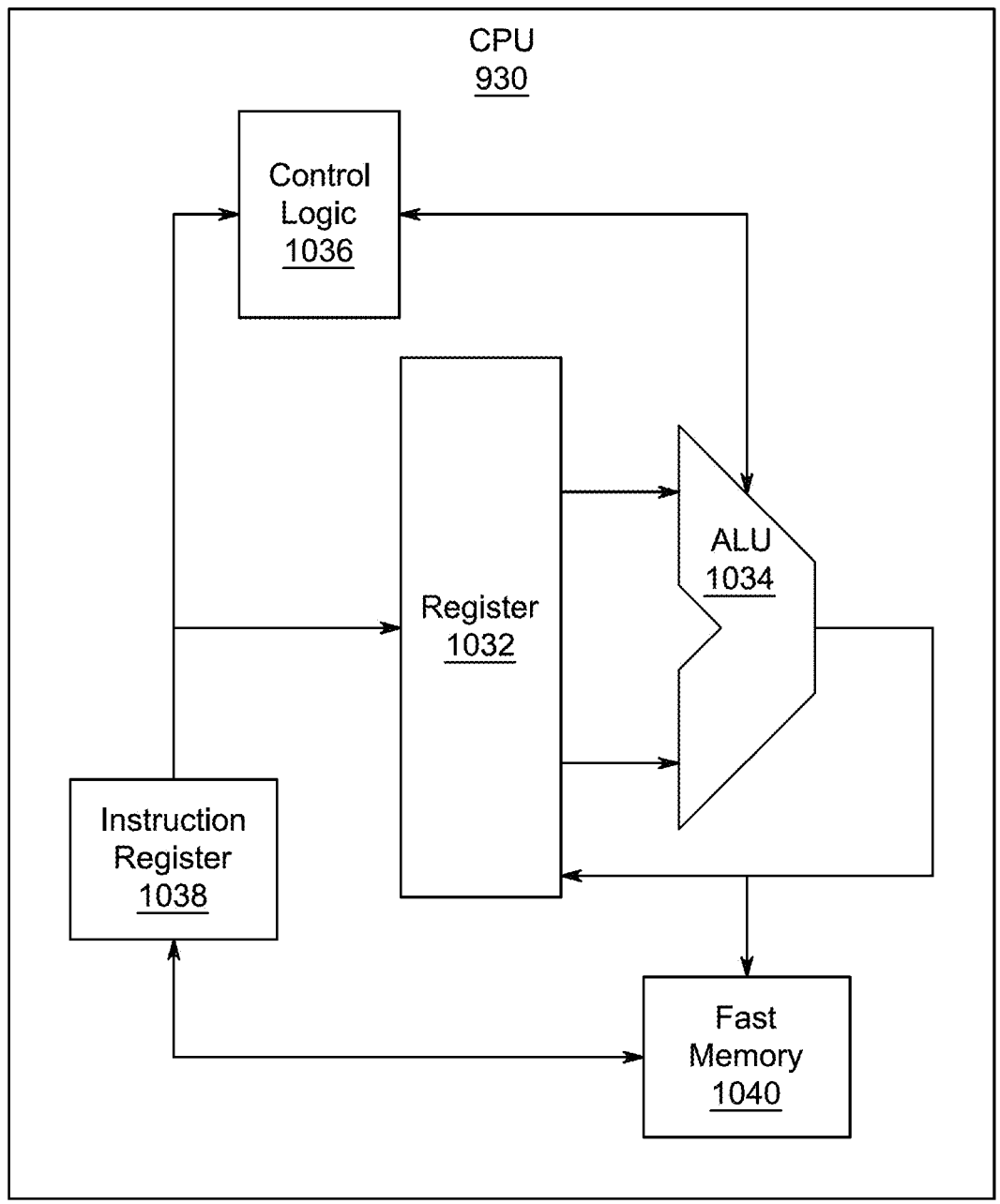
FIG. 10 is an exemplary schematic diagram of a processor used with the computing system, according to certain embodiments.

For example, FIG. 10 shows one implementation of CPU 930. In one implementation, the instruction register 1038 retrieves instructions from the fast memory 1040. At least part of these instructions are fetched from the instruction register 1038 by the control logic 1036 and interpreted according to the instruction set architecture of the CPU 930. Part of the instructions can also be directed to the register 1032. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1034 that loads values from the register 1032 and performs logical and mathematical operations on the loaded values according to the instructions. The results from these operations can be feedback into the register and/or stored in the fast memory 1040. According to certain implementations, the instruction set architecture of the CPU 930 can use a reduced instruction set architecture, a complex instruction set architecture, a vector processor architecture, a very large instruction word architecture. Furthermore, the CPU 930 can be based on the Von Neuman model or the Harvard model. The CPU 930 can be a digital signal processor, an FPGA, an ASIC, a PLA, a PLD, or a CPLD. Further, the CPU 930 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 9, the data processing system 900 can include that the SB/ICH 920 is coupled through a system bus to an I/O Bus, a read only memory (ROM) 956, universal serial bus (USB) port 964, a flash binary input/output system (BIOS) 968, and a graphics controller 958. PCI/PCIe devices can also be coupled to SB/ICH 988 through a PCI bus 962.

The PCI devices may include, for example, Ethernet adapters, add-in cards, and PC cards for notebook computers. The Hard disk drive 960 and CD-ROM 966 can use, for example, an integrated drive electronics (IDE) or serial advanced technology attachment (SATA) interface. In one implementation the I/O bus can include a super I/O (SIO) device.

Further, the hard disk drive (HDD) 1860 and optical drive 966 can also be coupled to the SB/ICH 920 through a system bus. In one implementation, a keyboard 970, a mouse 972, a parallel port 978, and a serial port 976 can be connected to the system bus through the I/O bus. Other peripherals and devices that can be connected to the SB/ICH 920 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 11:
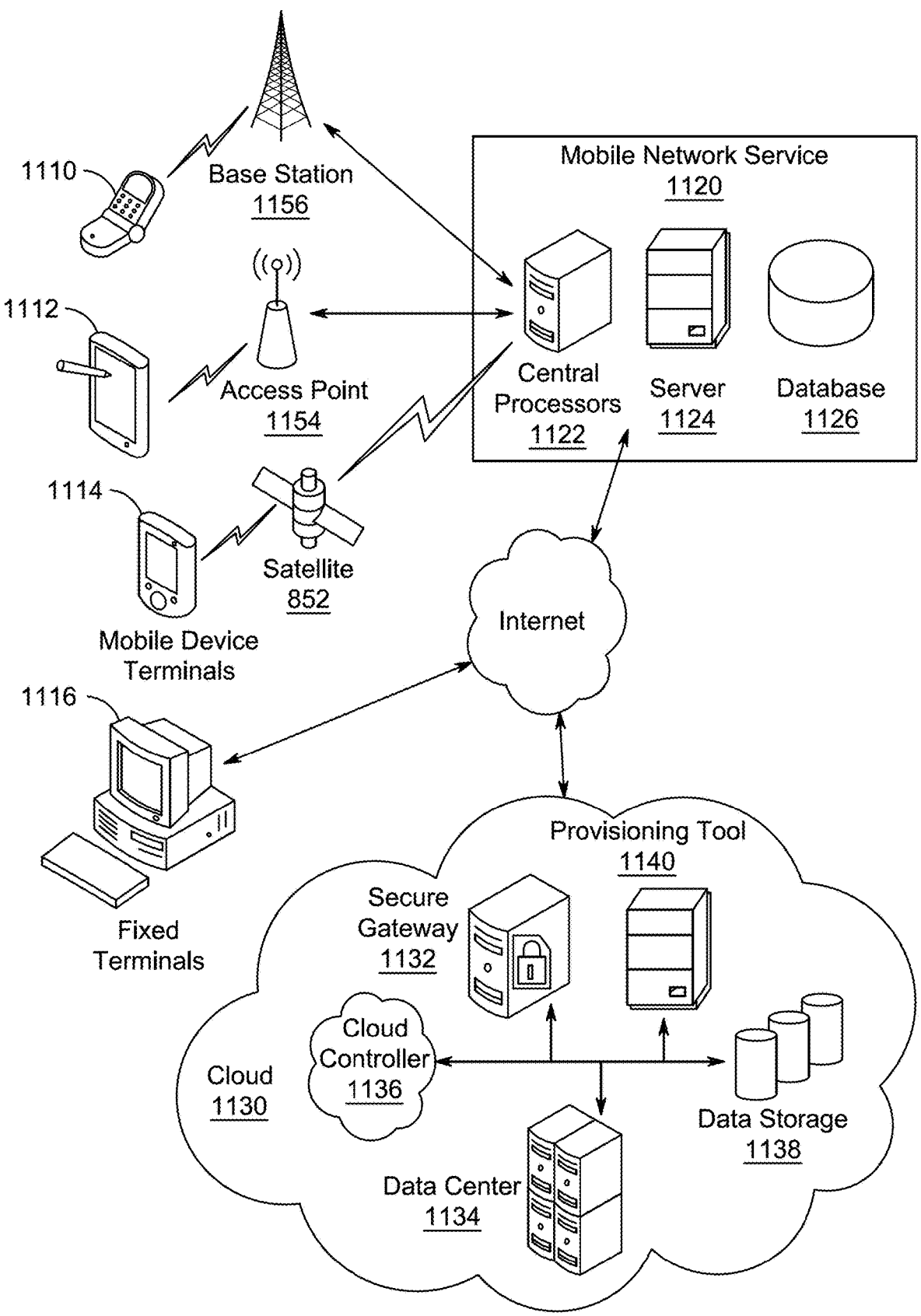
FIG. 11 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 1130 including a cloud controller 1136, a secure gateway 1132, a data center 1134, data storage 1138 and a provisioning tool 1140, and mobile network services 1120 including central processors 1122, a server 1124 and a database 1126, which may share processing, as shown by FIG. 11, in addition to various human interface and communication devices (e.g., display monitors 1116, smart phones 119, tablets 1112, personal digital assistants (PDAs) 1114). The network may be a private network, such as a LAN, satellite 1152 or WAN 1154, or be a public network, may such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A direct current (DC) power generation system, comprising:
    a DC microgrid (MG) cluster; and
    a distributed hierarchical control system for controlling operation of the DC MG cluster, wherein
    the DC MG cluster includes a plurality of DC MGs interconnected via tie-lines, electric power being transferred among the plurality of DC MGs, based on bus voltage differences between the plurality of DC MGs,
    each DC MG includes a plurality of distributed generation units (DGUs) interconnected via local tie-lines, the plurality of DGUs supplying electric power to local loads,
    the distributed hierarchical control system includes a primary controller, a secondary controller, and a tertiary controller,
    the distributed hierarchical control system further includes a two-layered cyber network, a lower layer of the cyber network being used for communication between the plurality of DGUs within each DC MG, an upper layer of the cyber network being used for communication between the plurality of DC MGs, pinning links being used for communication between the lower and upper layers,
    within a user-defined settling time, the tertiary controller manages power flow within the DC MG cluster to minimize an overall total generation cost of the plurality of DC MGs, the secondary controller ensures optimized power allocation among the plurality of DGUs of each DC MG, and the primary controller performs droop control for the plurality of DGUs of the plurality of DC MGs, and
    an upper limit of convergence time for the secondary controller and the tertiary controller is preset based on a single control parameter determined by a user of the power generation system, so as to perform a prescribed performance-based predefined time (PP PDT) control.

2. The DC power generation system of claim 1, wherein the tertiary controller minimizes the overall total generation cost of the plurality of DC MGs by adjusting reference voltages assigned to the plurality of DC MGs to optimize the electric power transferred among the plurality of DC MGs.

3. The DC power generation system of claim 2, wherein the tertiary controller adjusts the reference voltages by equalizing incremental costs of the plurality of DC MGs.

4. The DC power generation system of claim 3, the tertiary controller aligns the incremental costs of the plurality of DC MGs at a global optimum value, and confines tracking errors within a lower and an upper performance boundaries.

5. The DC power generation system of claim 1, wherein the tertiary controller includes distributed tertiary controllers across the plurality of DC MGs.

6. The DC power generation system of claim 2, wherein the secondary controller includes a load dispatch optimizer and a voltage regulator.

7. The DC power generation system of claim 6, wherein for each DC MG, the load dispatch optimizer balances incremental costs of the plurality of DGUs included in the DC MG, and maintain tracking error within a lower and an upper performance boundaries.

8. The DC power generation system of claim 6, wherein for each DC MG, the voltage regulator stabilizes an average voltage of the DC MG to the reference voltage assigned by the tertiary controller.

9. The DC power generation system of claim 8, each DC MG has one or more DGUs for receiving the reference voltage from the tertiary controller.

10. The DC power generation system of claim 1, wherein each DC MG includes a number of dispatchable DGUs and a number of non-dispatchable DGUs.

11. A method for operating a direct current (DC) power generation system, the DC power generation system including a DC microgrid (MG) cluster and a distributed hierarchical control system,
the DC MG cluster including a plurality of DC MGs interconnected via tie-lines, electric power being transferred among the plurality of DC MGs, based on bus voltage differences between the plurality of DC MGs,
each DC MG including a plurality of distributed generation units (DGUs) interconnected via local tie-lines, the plurality of DGUs supplying electric power to local loads,
the distributed hierarchical control system including a primary controller, a secondary controller, and a tertiary controller,
the distributed hierarchical control system further including a two-layered cyber network, a lower layer of the cyber network being used for communication between the plurality of DGUs within each DC MG, an upper layer of the cyber network being used for communication between the plurality of DC MGs, pinning links being used for communication between the lower and upper layers,
the method comprising, within a user-defined settling time:
via the tertiary controller, managing power flow within the DC MG cluster to minimize an overall total generation cost of the plurality of DC MGs,
via the secondary controller, ensuring optimized power allocation among the plurality of DGUs of each DC MG, and
via the primary controller, performing droop control for the plurality of DGUs of the plurality of DC MGs,
wherein an upper limit of convergence time for the secondary controller and the tertiary controller is preset based on a single control parameter determined by a user of the power generation system, so as to perform a prescribed performance-based predefined time (PP PDT) control.

12. The method for operating the DC power generation system of claim 11, wherein the tertiary controller minimizes the overall total generation cost of the plurality of DC MGs by adjusting reference voltages assigned to the plurality of DC MGs to optimize the electric power transferred among the plurality of DC MGs.

13. The method for operating the DC power generation system of claim 12, wherein the tertiary controller adjusts the reference voltages by equalizing incremental costs of the plurality of DC MGs.

14. The method for operating the DC power generation system of claim 13, wherein the tertiary controller aligns the incremental costs of the plurality of DC MGs at a global optimum value, and confines tracking errors within a lower and an upper performance boundaries.

15. The method for operating the DC power generation system of claim 11, wherein the tertiary controller includes distributed tertiary controllers across the plurality of DC MGs.

16. The method for operating the DC power generation system of claim 12, wherein the secondary controller includes a load dispatch optimizer and a voltage regulator.

17. The method for operating the DC power generation system of claim 16, wherein for each DC MG, the load dispatch optimizer balances incremental costs of the plurality of DGUs included in the DC MG, and maintain tracking error within a lower and an upper performance boundaries.

18. The method for operating the DC power generation system of claim 16, wherein for each DC MG, the voltage regulator stabilizes an average voltage of the DC MG to the reference voltage assigned by the tertiary controller.

19. The method for operating the DC power generation system of claim 18, each DC MG has one or more DGUs for receiving the reference voltage from the tertiary controller.

20. The method for operating the DC power generation system of claim 11, wherein each DC MG includes a number of dispatchable DGUs and a number of non-dispatchable DGUs.

* * * * *